United States Patent [19]
Itakura et al.

[11] Patent Number: 5,901,149
[45] Date of Patent: May 4, 1999

[54] DECODE AND ENCODE SYSTEM

[75] Inventors: Eisaburo Itakura, Kanagawa; Paul Hodgins, Tokyo, both of Japan

[73] Assignee: Sony Corporation, Tokyo, Japan

[21] Appl. No.: 08/554,285

[22] Filed: Nov. 6, 1995

[30] Foreign Application Priority Data

| Nov. 9, 1994 | [JP] | Japan | 6-274693 |
| Nov. 10, 1994 | [JP] | Japan | 6-276324 |
| Apr. 4, 1995 | [JP] | Japan | 7-078572 |

[51] Int. Cl.$^6$ ............... H04J 3/12; H04N 7/12; H03M 7/34
[52] U.S. Cl. ............ 370/468; 370/517; 386/109; 375/372; 348/419; 341/51; 341/61
[58] Field of Search ............ 341/51, 61; 360/39, 360/40; 375/371, 372, 240, 241; 348/419, 423; 370/421, 415, 468, 477, 517, 545; 386/65, 98, 101, 109, 112, 46, 116

[56] References Cited

U.S. PATENT DOCUMENTS

| 3,188,569 | 6/1965 | Mahoney | 375/371 |
| 5,381,408 | 1/1995 | Brent et al. | 370/517 |
| 5,508,745 | 4/1996 | Jo | 348/419 |
| 5,566,208 | 10/1996 | Balakrishnan | 348/419 |
| 5,598,445 | 1/1997 | Pinto et al. | 375/372 |
| 5,623,512 | 4/1997 | Sasaki | 375/372 |
| 5,719,982 | 2/1998 | Kawamura et al. | 386/65 |

*Primary Examiner*—Douglas W. Olms
*Assistant Examiner*—Shick Hom
*Attorney, Agent, or Firm*—Frommer Lawrence & Haug, LLP.; William S. Frommer

[57] ABSTRACT

According to decode system and method of the present invention in which a system clock is generated on the basis of a time stamp contained in transmission data to be transmitted every packet, and the transmission data are decoded on the basis of the system clock, the transmission data are stored into a buffer memory before a time stamp is extracted, and a packet storage amount of the transmission data stored in the buffer memory is detected to increase the read-out rate of the transmission data from the buffer memory when the storage amount is larger than a predetermined reference value and reduce the read-out rate of the transmission data from the buffer memory when the storage amount is smaller than the predetermined reference value.

25 Claims, 16 Drawing Sheets

DECODE AND ENCODE SYSTEM

BACKGROUND OF THE INVENTION

1. Field of the Invention

The present invention relates to an encode system, an encode method, a decode system, a decode method, an encode data recording device, an encode data recording method, an encode data transmitting device, an encode data transmitting method and a recording medium which are suitably used when audio data or video data are digitalized and packeted according to an MPEG (Moving Picture Experts Group) system, and these data are transmitted through a prescribed network and received at a reception side.

2. Description of Related Art

FIG. 15 shows the construction of a conventional data transmission system.

An encoder 1 encodes video signals and audio signals according to an MPEG-2 system, for example, and inputs these data to a system encoder 2. The system encoder 2 packets the input video signals and the audio signals, and also adds time stamps to these data to transmit the data onto a network 3. The network 3 is an ATM (Asynchronous Transfer Mode) network, for example, and a statistical multiplexing processing is conducted. That is, when data of a packet are transmitted, data of another packet are held in a buffer memory. When the transmission of the data of the packet concerned is completed, the data of the other packet (cells) are read out from the buffer memory and a transmission processing is executed on many nodes constituting the network 3.

The data which are transmitted through the network 3 are input to a system decode 4. For example, as shown in FIG. 16, the system decoder 4 is constructed by a time stamp take-out circuit 11, a PLL circuit 12 and a system decoder 13. The system decoder 13 releases the packetting of the input packeted audio data and the video data, and outputs the obtained audio stream and the video stream to the decoder 5.

On the other hand, the time stamp take-out circuit 11 takes out a time stamp contained in the input data, and outputs it to the PLL circuit 12. The PLL circuit 12 generates a system clock by using the input time stamp, and outputs the system clock to the decoder 5. In the case of the MPEG-2 system, the frequency of the system clock is set to 27 MHz.

The decoder 5 decodes the streams of the audio data and the video data supplied from the system decoder 13 on the basis of the system clock input from the PLL circuit 12.

The PLL circuit 12 is constructed as shown in FIG. 17, for example. The time stamp which is extracted by the time stamp take-out circuit 11 is input to a subtracter 21. The time stamp is set as PCR (Program Clock Reference) in the transport stream of the MPEG-2 system. The transport stream is set as a fixed packet of 188 bytes, and it is transmitted as a stream of a fixed speed. PCR is transmitted at an interval within at least 0.1 second. In the case of transmission, it is disposed at the header of a packet.

PCR represents the timing of an encode in the encoder 1 by a count value of the system clock of the system encoder 2. The subtracter 21 calculates the difference between the PCR and the count value of the system clock of the counter 24 (system clock in the system decoder 4). The output of the subtracter 21 is input to a low-pass filter (LPF) 22 and smoothed, and then input to a DA (Digital/Analog) converter and VCO (voltage control oscillator) 23. The DA converter and VCO 23 converts the digital signal input from the low-pass filter 22 to the analog signal, and uses the analog signal as a control voltage to produce a system clock whose frequency corresponds to the control voltage.

The system clock is supplied to the decoder 5, and also input to the counter 24 to be counted. The count value of the counter 24 is supplied to the subtracter 21 as a signal representing the frequency and phase of the system clock at that time.

When the data encoded at the transmission side are transmitted through the network 3 to the reception side and then decoded at the reception side as described above, the system clock of the decoder side could be easily synchronized with the system clock of the encoder side if the time stamps arrive at the decoder side at the accurately same interval.

However, there actually occurs delay fluctuation on the network 3. That is, the network 3 carries out the statistical multiplexing processing on the data every packet, and in order to transmit a prescribed packet and another packet onto one transmission path, one packet is required to be stored in a buffer memory and kept on standby when the other packet is transmitted. When the transmission of one packet is completed, the transmission processing of the other packet which is kept on standby is performed. Since the processing as described above is carried out on many nodes (ATM switches) in the network 3, the transmitted packet (ATM cell) is caused to have random delay fluctuation. If the delay fluctuation is left as it is, it will be difficult to perform the accurate decoding operation at the decoder side.

Therefore, in order to cancel the random delay fluctuation, it is considered that the time stamps are rewritten into values which are in consideration of the delay fluctuation. However, this processing complicates the construction of the network 3.

Alternatively, it is considered that the random delay fluctuation in the network 3 is absorbed by a PLL circuit 12. However, since the delay fluctuation is extremely large, in order to absorb the random delay fluctuation, the PLL circuit 12 needs a long time to synchronize it or must be designed in a complicated circuit construction.

Furthermore, in the encoder 1, the encode processing is carried out at a variable bit rate. Therefore, data quantity increases for a complicated image, and it is reduced for a simple image.

On the other hand, in the transport stream, the length of the packet is set to a constant value of 188 bytes. Therefore, when data quantity is large, the arrival interval of packets is short. When the data quantity is small, the arrival interval of packets is long. That is, the data rate at which the packet is transmitted is varied in accordance with the code quantity produced in the encoder 1.

When the variation of the arrival interval and the delay fluctuation as described above are left as they are, it would be difficult to perform the accurate decoding operation at the decoder side.

The above problem also occurs when the data output from the system encoder 2 are not directly transmitted, but temporarily stored in a recording medium and then transmitted,

SUMMARY OF THE INVENTION

An object of the present invention is to absorb delay fluctuation occurring on a network without complicating the construction of a device.

Another object of the present invention is to absorb variation obtained by synthesizing variation of the arrival interval of packets and delay fluctuation.

According to a decode system and a decode method of the present invention, a read-out rate stored data is controlled in accordance with data storage amount, so that the delay fluctuation on a transmission path can be absorbed.

According to an encode system (claim 11) and an encode method (claim 16) of the present invention, data are transmitted while packeted, and the interval of packets is transmitted together with data. Therefore, the data are transmitted at a variable bit rate and the data can be accurately decoded even when delay fluctuation occurs on the network.

According to a decode system (claim 12) and a decode method (claim 17) of the present invention, a delay amount of a packet is suitably controlled in accordance with the interval data of a transmitted packet. Therefore, even in the case of the variable bit rate, the data can be accurately read out irrespective of the delay fluctuation of the data on the network.

According to an encode system (claim 18) and an encode method (claim 19), data are encoded at a variable bit rate and the encoded data are added with time stamps to be packeted. In addition, the data rate when the packet is transmitted is set every predetermined section, and the packet transmission interval is calculated in correspondence to the data rate. The data rate data for the data rate and the packeted data are transmitted at the calculated transmission interval. Accordingly, even when the delay fluctuation occurs on the network, the data can be accurately decoded.

According to an encode data recording device (claim 20) and an encode data recording method (claim 21), data which are encoded at a variable bit rate and then added with time stamps to be packeted, and the data rate data corresponding to the data rate at which the packet is transmitted, are stored, and then suitably read out and recorded on a recording medium. Accordingly, the data can be recorded highly efficiently.

According to an encode data transmitting device (claim 22) and an encode data transmitting method (claim 23), data are read out from a recording medium on which data which are encoded at a variable bit rate and then added with time stamps to be packeted are recorded together with the data rate data corresponding to the data rate at which the packet is transmitted, and the data rate data are detected from the read-out data. The transmission interval of the packet is calculated in correspondence to the data rate data, and the packet is transmitted together with the data rate data at the calculated transmission interval. Accordingly, even when the delay fluctuation occurs on the network, the data can be accurately decoded.

According to a recording medium (claim 24) of the present invention, data which are encoded at a variable bit rate and then added with time stamps to be packeted, are recorded together with the data rate data corresponding to the data rate at which the packet is transmitted. Therefore, the data can be accurately decoded even when the delay fluctuation occurs on the network at the time when the data read out from the recording medium are transmitted through the network.

Each of the foregoing and additional objects are achieved by the provision of the encode system and the encode method, the decode system and the decode method, the encode data storing device and the encode data recording method, the encode data transmitting device and the encode data transmission method, and the recording medium.

The decode system according to the present invention includes extraction means (for example, a time stamp take-out circuit 11 of FIG. 1) for extracting time information (for example, a time stamp PCR) contained in transmission data, system clock generating means (for example, PLL circuit 12 of FIG. 1) for generating a system clock serving as a criterion to process the transmission data, storing means (for example, a buffer memory 41 of FIG. 2) for storing the transmission data supplied to the extraction means, detection means (for example, a counter 43 of FIG. 2) for detecting a storage amount of the transmission data in the storing means, and read-out control means (for example, a buffer control circuit 55 of FIG. 2) for controlling a read-out rate of the transmission data from the storing means in accordance with the detection result of the detection means so that the readout rate of the transmission data from the storing means is increased when the storage amount is larger than a predetermined reference value, and the read-out rate of the transmission data from the storing means is reduced when the storage amount is smaller than the predetermined reference value. The time information may be set as a time stamp.

The detection means may be provided with count means (for example, a counter 43 of FIG. 2) for counting the number of units of the transmission data stored in the storing means. In this case, the unit may be set as a packet.

The counter means may increment its count value when a packet is stored, and decrement its count value when a packet is read out.

The device may be further provided with timing signal generating means (for example, a timing signal generating circuit 46 of FIG. 2) for generating a timing signal to sample the count value of the counting means, comparing means (a comparator 44 of FIG. 2) for comparing a predetermined reference value and the count value of the counting means when the timing signal generating means generates a timing signal, and reference value generating means (for example, a reference level generator 45 of FIG. 2) for generating the reference value to be compared in the comparing means.

The timing signal generating means comprises a counter (for example, a counter 47 of FIG. 2) for counting a predetermined count clock, a comparator (for example, a comparator 48 of FIG. 2) for comparing the count value of the counter and a predetermined reference count value, and reference count value generating means (for example, a sample time generator 49 of FIG. 2) for generating the reference count value.

The read-out control means may be provided with setting means (for example, an output rate setting circuit 52 of FIG. 2) for setting a read-out rate of transmission data stored in the storing means, and converting means (for example, a converting circuit 51 of FIG. 2) for converting the output of the comparing means to the read-out rate of the transmission data and outputting the read-out rate to the setting means.

The setting means may be provided with a counter (for example, a counter 54 of FIG. 2) for counting a predetermined count clock, a read-out rate setting circuit (for example, an output rate setting circuit 52 of FIG. 2) for setting a predetermined read-out rate in accordance with the output of the converting means, and a comparator (for example, a comparator 53 of FIG. 2) for comparing the count value of the counter and the output of the read-out rate setting circuit.

The decode method according to the present invention in which a system clock is generated on the basis of a time stamp contained in transmission data to be transmitted every packet, and the transmission data are decoded on the basis of the system clock, comprises the steps of storing the transmission data into a buffer memory (for example, a buffer memory 41 of FIG. 2) before a time stamp is extracted and detecting a packet storage amount of the transmission data stored in the buffer memory to increase the read-out rate of the transmission data from the buffer memory when the storage amount is larger than a predetermined reference value and reduce the read-out rate of the transmission data from the buffer memory when the storage amount is smaller than the predetermined reference value.

In the decode system and the decode method according to the present invention, the transmission data to be transmitted every packet (on a packet basis) are stored in the buffer memory 41. When the number of packets stored in the buffer memory 41 is larger than the predetermined reference value, the read-out rate is set to a large value. On the other hand, when the number of packets is smaller than the predetermined reference value, the read-out rate is set to a small value. Accordingly, the data which are transmitted through a network can be accurately processed.

The encode system according to the present invention (claim 11) comprises encode means for encoding data at a variable bit rate, packetting means for adding time stamps to the encoded data to packet the data, calculating means for calculating the interval of the packet which is packeted by the packetting means, and transmission means for transmitting the packet packeted by the packetting means and interval data for the interval calculated by the calculating means.

The decode system according to the present invention (claim 12) comprises storing means for storing data of a variable bit rate which is transmitted on a packet basis, interval data detection means for detecting interval data for the interval of packets which are transmitted together with data, and delay time control means for controlling a delay time from the time when the packet is stored in the storing means until the time when it is read out, in accordance with the detection result of the interval data detection means.

The storing means may be provided with first storing means for storing plural packets and second storing means for storing a packet read out from the first storing means, and the delay time control means may control the first and second storing means so that the total time of the delay time of the first storing means and the delay time of the second storing means is equal to a predetermined time. Further, the decode system may further provided with storage amount detection means for detecting the amount of packets stored in the storing means, and output rate control means for controlling the output rate at which the packet is read out and output from the storing means, in accordance with the detecting result of the storage amount detection means.

The encode method according to the present invention (claim 16) comprises the steps of encoding data at a variable bit rate, adding time stamps to the encoded data to packet the data, calculating the interval of the packet of the encoded and packeted data, and transmitting interval data of the interval together with the packet.

The decode method according to the present invention (claim 17) comprises the steps of storing into a memory the data which are transmitted on a packet basis at a variable bit rate, extracting the interval data corresponding to the interval of the packet from the data, controlling the output rate at which the data stored in the memory are read out and output, in accordance with the extracted interval data, extracting the time stamp from the data output from the memory, generating a system clock with the extracted time stamp, and decoding the data output from the memory by using the generated system clock.

The encode system according to the present invention (claim 18) comprises encode means for encoding data at a variable bit rate, generating means for generating time stamps to be added to the data, packetting means for adding the encoded data with time stamps to packet the data, setting means for setting a data rate for packet transmission every predetermined section, calculating means for calculating a transmission interval of the packet in accordance with the data rate, and transmitting means for transmitting data rate data of the data rate and the packet at the transmission interval calculated by the calculating means.

The encode method according to the present invention (claim 19) comprises the steps of encoding data at a variable bit rate, adding the encoded data with time stamps to packet the data, setting a data rate for packet transmission every predetermined section, calculating a packet transmission interval in accordance with the data rate, and transmitting the data rate data of the data rate and the packet at the calculated transmission interval.

The encode data recording device according to the present invention (claim 20) comprises storing means for storing input data which are encoded at a variable bit rate and added with time stamps to be packeted and the data rate data of the data rate at which the packet is transmitted, and recording means for reading out the data stored in the storing means and recording the read-out data onto a recording medium.

The encode data recording method according to the present invention (claim 21) comprises the steps of storing input data which are encoded at a variable bit rate and added with time stamps to be packeted and the data rate data of the data rate at which the packet is transmitted, and reading out the recorded data and recording the read-out data onto a recording medium.

The encode data transmission device according to the present invention (claim 22) comprises read-out means for reading out data from a recording medium on which encoded data which are encoded at a variable bit rate and added with a time stamp to be packeted are recorded together with data rate data of a data rate at which the packet is transmitted, detection means for detecting the data rate data from the data, calculating means for calculating a packet transmission interval in accordance with the data rate data, and transmitting means for transmitting the packet together with the data rate data at the transmission interval calculated by the calculating means.

The encode data transmission method according to the present invention (claim 23) comprises the steps of reading out data from a recording medium on which encoded data which are encoded at a variable bit rate and added with a time stamp to be packeted are recorded together with data rate data of a data rate at which the packet is transmitted, detecting the data rate data from the data, calculating means for calculating a packet transmission interval in accordance with the data rate data, and transmitting the packet together with the data rate data at the calculated transmission interval.

The recording medium according to the present invention (claim 24) are recorded with encoded data which are encoded at a variable bit rate and added with a time stamp to be packeted, and data rate data of a data rate at which the packet is transmitted.

In the encode system according to the present invention (claim 11), the encode means encodes the data at a variable bit rate, and the packetting means adds the encoded data with the time stamps to packet the data. The calculating means calculates the interval of the packet packeted by the packetting means, and the transmitting means transmits the data packeted by the packetting means and the interval data of the interval calculated by the calculating means.

In the decode system according to the present invention (claim 12), the storing means stores the data which are transmitted on a packet basis at a variable bit rate, and the interval data detection means detects the interval data of the interval of the packet which is transmitted together with the data. The delay time control means controls the delay time from the time when the packet is stored in the storing means until the time when the it is read out, in accordance with the detection result of the interval data detection means.

In the encode method according to the present invention (claim 16), the data are encoded at a variable bit rate, and th e encoded data are added with the time stamps to be packeted. The interval of the packet obtained by packetting the encoded data is calculated and the interval data of the interval is transmitted together with the packet.

In the decode method according to the present invention (claim 17), the data which are transmitted on a packet basis at a variable bit rate are stored in the memory, and the interval data of the packet interval are extracted from the data. The output rate at which the data stored in the memory are read out and output is controlled in accordance with the extracted interval data, and the time stamp is extracted from the data output from the memory. Further, the system clock is generated with the extracted time stamps, and the data output from the memory are decoded by using the generated system clock.

In the encode system according to the present invention (claim 18), the encode means encodes the data at a variable bit rate, and the packetting means adds the encoded data with the time stamps to packet the data. The setting means sets the data rate when the packet is transmitted, every predetermined section, and the calculating means calculates the packet transmission interval in accordance with the data rate. The transmitting means transmits the packet as well as the data rate data of the data rate at the transmission interval calculated by the calculating means.

In the encode method according to the present invention (claim 19), the data are encoded at a variable bit rate, and the encoded data are added with the time stamps to be packeted. Furthermore, the data rate for the packet transmission is set every predetermined section, and the packet transmission interval is calculate in accordance with the data rate. The packet is transmitted together with the data rate of the data rate at the calculated transmission interval.

In the encode data recording device according to the present invention (claim 20), the storing means stores the input data which are encoded at a variable bit rate and added with the time stamps to be packeted and the data rate data of the data rate at which the packet is transmitted, and the recording means reads out the data stored in the storing means and records the read-out data onto a recording medium.

In the encode data recording method according to the present invention (claim 21), the input data which are encoded at a variable bit rate and added with the time stamps to be packeted and the data rate data of the data rate at which the packet is transmitted are stored, and the data stored in the storing means are read out and recorded the read-out data onto a recording medium.

In the encode data transmission device according to the present invention (claim 22), the read-out means reads out the data from the recording medium on which the data which are encoded at a variable data and then added with the time stamps to be packeted are recorded together with the data rate of the data rate at which the packet is transmitted, and the detection means detects the data rate data from the data. The calculating means calculates the packet transmission interval in accordance with the data rate data, and the transmission means transmits the packet together with the data rate data at the transmission interval calculated by the calculating means.

In the encode data transmission method according to the present invention (claim 23), the data are from the recording medium on which the data which are encoded at a variable data and then added with the time stamps to be packeted are recorded together with the data rate of the data rate at which the packet is transmitted, and the data rate data are detected from the data. The packet transmission interval is calculated in accordance with the data rate data, and the packet is transmitted together with the data rate data at the calculated transmission interval.

On the recording medium according to the present invention (claim 24) are recorded the data which are encoded at a variable bit rate and then added with the time stamps to be packeted, together with the data rate data of the data rate at which the packet is transmitted.

The above, and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF THE PREFERRED EMBODIMENTS

Preferred embodiments according to the present invention will be described hereunder with reference to the accompanying drawings.

Figure 15:
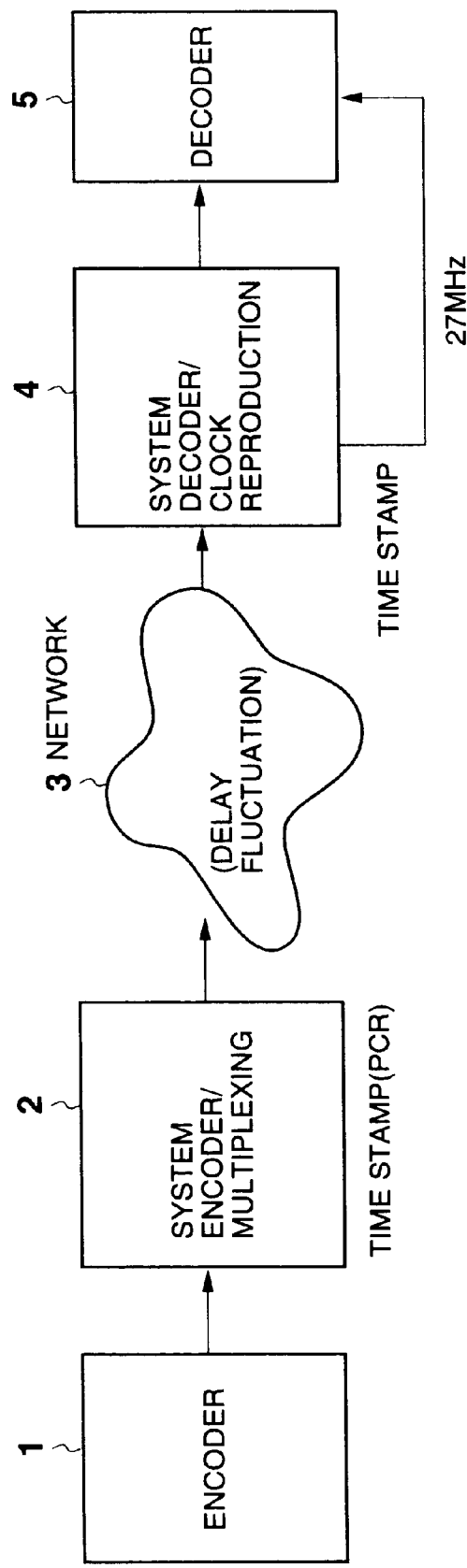
FIG. 15 is a diagram showing the construction of a transmission path.

In this invention, as shown in FIG. 15, video data and audio data which are encoded by an encoder 1 are packeted and then added with time stamps in a system encoder 2, and then transmitted to a reception side through a network 3 having delay fluctuation.

At the reception side, the packet is decomposed in a system decoder 4, and a video stream and an audio stream are supplied to a decoder 5. In addition, the time stamps are separated and extracted in the system decoder 4 to generate system clocks in synchronization with the time stamps and supply the system clocks to the decoder 5. In the decoder 5, the audio data and the video data are subjected to decode processing on the basis of the system clocks.

Figure 1:
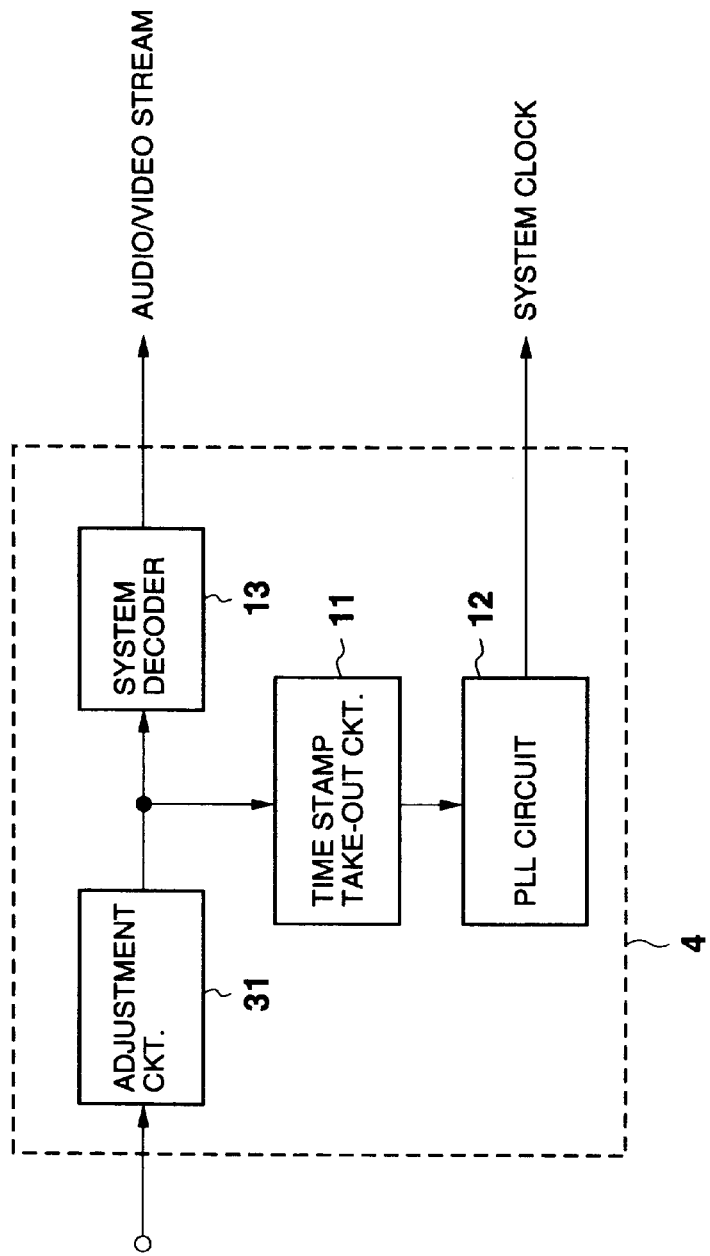
FIG. 1 is a block diagram showing the construction of a system decoder according to the present invention.
Figure 16:
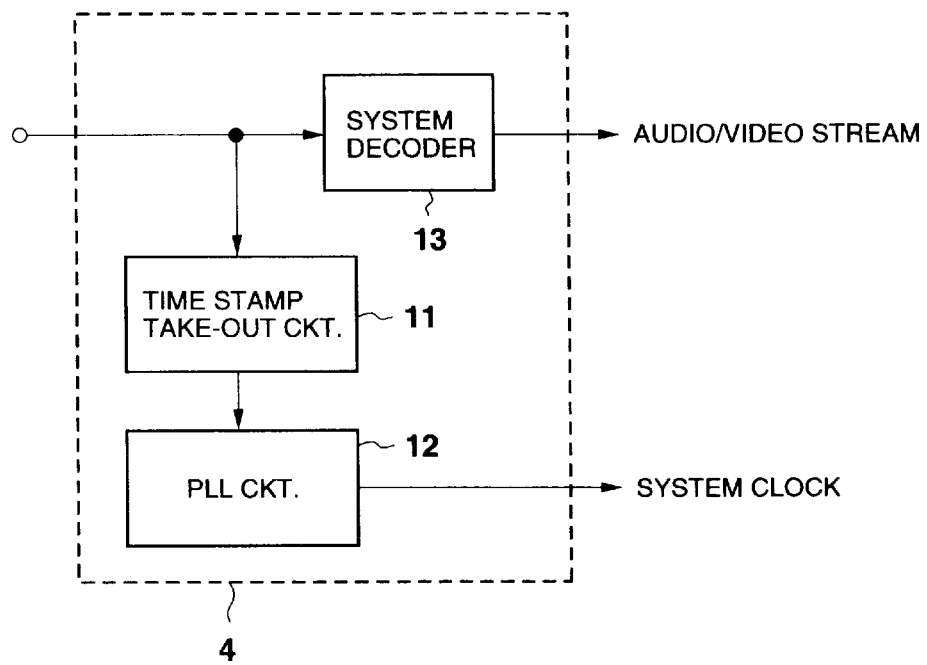
FIG. 16 is a block diagram showing the construction of a conventional system decoder.

In the present invention, the system decoder 4 is designed as shown in FIG. 1, for example. That is, in addition to the time stamp take-out circuit 11, the PLL circuit 12 and the system decoder 13 of the system decoder 4 of FIG. 16, the system decoder 4 further includes an adjustment circuit 31. The data which are supplied from the network 3 are adjusted by the adjustment circuit 31, and then input to the system decoder 13 and the time stamp take-out circuit 11.

Figure 2:
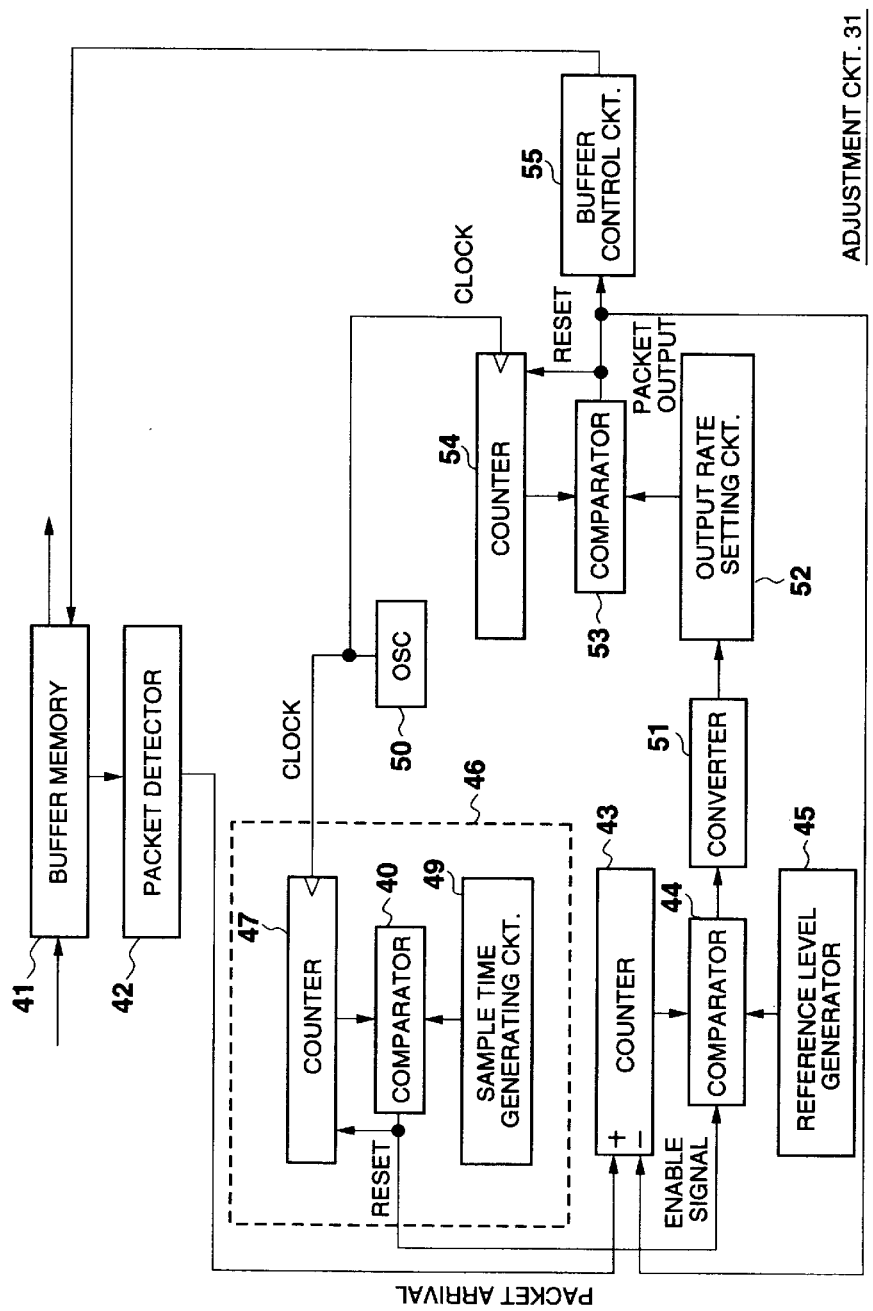
FIG. 2 is a block diagram showing the construction of an adjustment circuit 31 of FIG. 1.

FIG. 2 shows the construction of the adjustment circuit 31. In this embodiment, the transmitted data are temporarily stored in a buffer memory 41, and then supplied to the system decoder 13 and the time stamp take-out circuit 11. The buffer memory 41 stores the data on a packet basis (i.e., a packet is used as a storage unit). When a packet is stored in the buffer memory 41, a packet detector 42 detects the packet and outputs a detection signal to an addition input terminal of a counter 43.

A packet output signal output from a comparator 53 is input to a subtraction input terminal of the counter 43. Upon input of the packet output signal from the comparator 53, a buffer control circuit 55 reads out data of only one packet from the buffer memory 41. A part of the signal output from the comparator 53 to the buffer control circuit 55 is supplied to the subtraction input terminal of the counter 43 as described above. Accordingly, the counter 43 counts the number of packets stored in the buffer memory 41.

The count value of the counter 43 is supplied to a comparator 44 to be compared with a reference level output from a reference level generator 45. Upon input of a timing signal (enable signal) output from a timing signal generating circuit 46, the comparator 44 performs its comparison operation.

The timing signal generating circuit 46 comprises a counter 47 for counting clock clocks output from an oscillator (OSC) 50, a sample time generating circuit 49 for outputting a sample time signal serving as a criterion for a sampling timing of packets stored in the buffer memory 41, and a comparator 49 for comparing the count value of the counter 47 and the output of the sample time generating circuit 49 to output the comparison result to the comparator 44 as an enable signal. The counter 47 is reset in accordance with the output of the comparator 48.

The comparator 44 compares the count value of the counter 43 and the reference level output from the reference level generator 45 and outputs the comparison result to an output rate setting circuit 52 through a converter 51. The converter 51 converts the data corresponding to a storage amount of packets stored in the buffer memory 41, which are output from the comparator 44, into an output rate at which the data are read out from the buffer memory 41.

The output rate which is set in the output rate setting circuit 52 is input to a comparator 53. The comparator 53 is supplied with a count value of a counter 54 for counting clocks output from the oscillator 50. The comparator 53 outputs the packet output signal to the buffer control circuit 55 when the count value of the counter 54 is equal to a value corresponding to the output of the output rate setting circuit 52. Upon input of a packet output signal, the buffer control circuit 55 controls the buffer memory 41 to read out the data of one packet from the buffer memory 41. The packet output signal which is output from the comparator 53 is supplied to the counter 54 as a reset signal, and also supplied to the subtraction input terminal of the counter 43.

Figure 3:
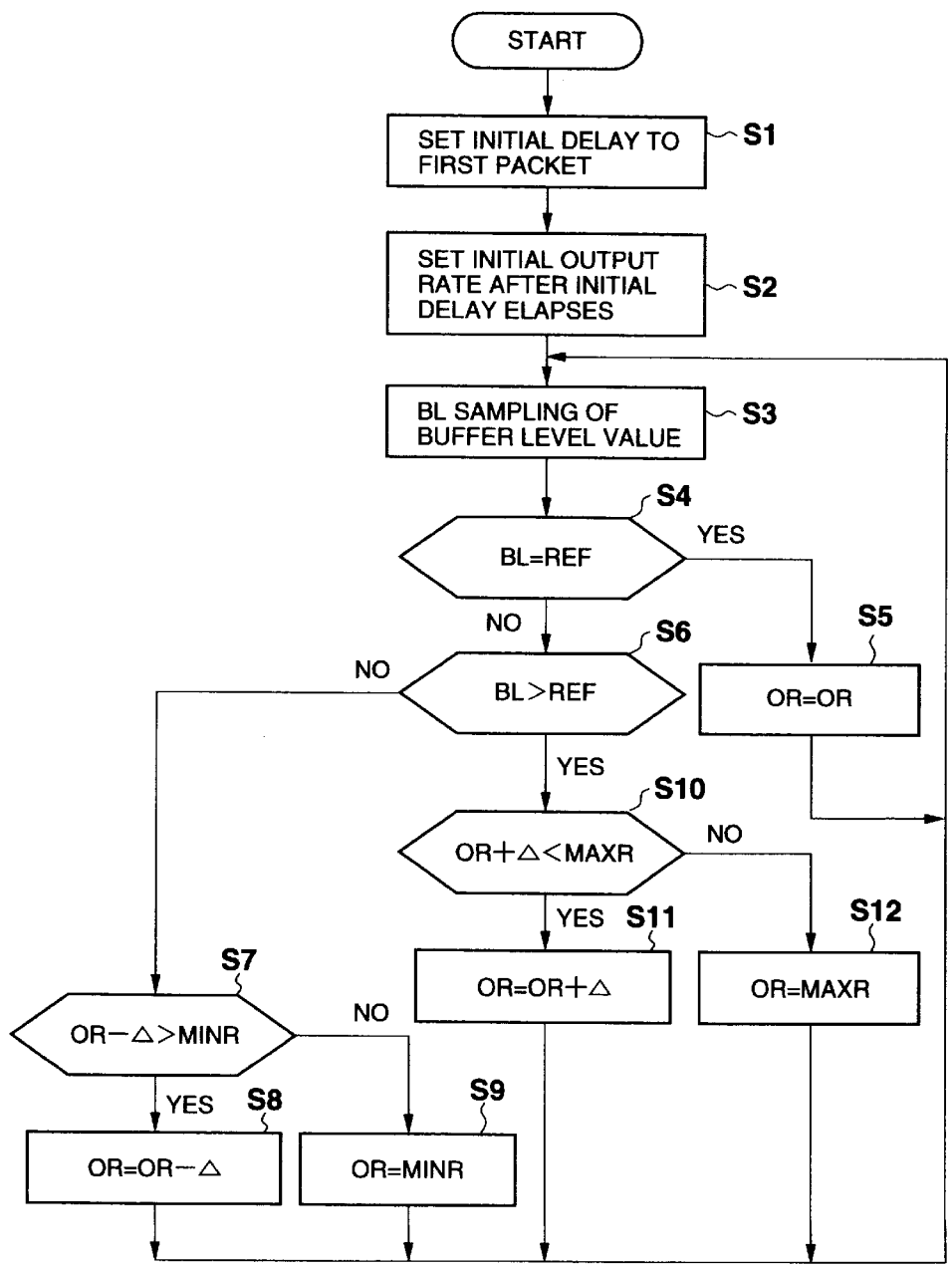
FIG. 3 is a flowchart for an operation of an embodiment of FIG. 2.

Next, the operation of the adjustment circuit 31 will be described with reference to a flowchart of FIG. 3.

First, in step S1 is set an initial delay time value of the buffer memory 41 for a first packet which is first input to the buffer memory 41, and then in step S2 is set an initial output rate value of the buffer memory 41. That is, the read-out (output rate) of the buffer memory 41 is controlled in accordance with the number of packets stored in the buffer memory 41, and for the first input packet, an expected value in a transmission path (network) is preset as an initial value.

Next, the process goes to step S3 to sample the number of packets stored in the buffer memory 41 and set its sampled value to a variable BL.

That is, the counter 43 counts up its output detection signal when the packet detector 42 detects that the packet is stored in the buffer memory 41. When the comparator 53 outputs a packet output signal to the buffer control circuit 55 to instruct the read-out (output) of data of one packet stored in the buffer memory 41, the counter 43 counts down the packet output signal to be output from the comparator 53. As a result, in the counter 43 is held a value corresponding to the number of packets stored in the buffer memory 41.

Furthermore, the comparator 48 compares the count value of the counter 47 with a predetermined reference value which is preset in the sample time generating circuit 49, and outputs an enable signal to the comparator 44 when the count value is equal to the reference value. The counter 47 is reset when the comparator 48 outputs the enable signal, and starts its count operation of the count clocks output from the oscillator 50 again. This operation is repeated, so that the comparator 48 of the timing signal generating circuit 46 generates the enable signal at a fixed period (period corresponding to the value set in the sample time generating circuit 49).

Subsequently, in step S4 the comparator 44 compares the count value (BL) of the counter 43 with the reference level (REF) set in the reference level generator 45 at the timing at which the comparator 48 of the timing signal generating circuit 46 outputs the enable signal.

If the comparator 44 judges that the count value BL of the counter 43 is equal to the reference level REF of the reference level generator 45, the process goes to step S5 in which the converter 51 keeps the output rate OR to be set in the output rate setting circuit 52 to a current output rate OR. Thereafter, the process returns to the step S3 to repetitively carry out the subsequent processing.

That is, the comparator 44 controls the output rate setting circuit 52 through the converter 51 when the count value BL of the counter 43 is equal to the reference level REF output from the reference level generator 45, and leaves the output rate OR set in the output rate setting circuit 52 as it is.

On the other hand, if the count value BL of the counter 43 and the reference level REF of the reference level generator 45 are judged not to be equal to each other in step S4, the process goes to step S6 to judge whether the count value BL is larger than the reference level REF.

If the count value BL is judged to be larger than the reference level REF, the process goes to step S10 to judge whether the sum value (OR+Δ) of the output rate OR set in the output rate setting circuit 52 and an alteration width (Δ) is smaller than a predetermined maximum value MAXR of the output rate. If the value (OR+Δ) is smaller than MAXR, the process goes to step S11 to set the sum value (OR+Δ) of the current output rate OR and the alteration width (A) as a new output rate OR. On the other hand, if in step S10 the value (OR+Δ) is equal to or larger than MAXR, the process goes to step S12 to set the maximum value MAXR as the output rate OR.

That is, the converter 51 outputs to the output rate setting circuit 52 an output rate which is larger by an amount corresponding to the alteration width Δ when the value output from the comparator 44 is positive (when the count value BL of the counter 43 is larger than the reference level REF). With this operation, the output rate OR which has been set in the output rate setting circuit 52 is altered to a value which is increased by the alteration width Δ.

On the other hand, if the value (OR+Δ) is equal to or larger than MAXR, the converter 51 sets the maximum value MAXR as the output rate in the output rate setting circuit 52.

On the other hand, if in the step S6 the count value BL is judged to be equal to or smaller than the reference level REF, the process goes to step S7 to judge whether the value (OR−Δ) obtained by subtracting the alteration width Δ from the output rate OR is larger than the minimum value MINR of the output rate. If the value (OR−Δ) is judged to be larger than MINR, the process goes to step S8 to set as a new output rate OR the value (OR−Δ) obtained by subtracting the alteration width Δ from the current output rate OR.

If in the step S7 the value (OR−Δ) is equal to or smaller than MINR, the process goes to step S9 to set the minimum value MINR as the new output rate OR.

That is, when the counter value BL is equal to or smaller than the reference level REF, the converter 51 judges whether the value obtained by subtracting the alteration width Δ from the current output rate OR is larger than MINR. If the value (OR−Δ) is larger than MINR, the value obtained by subtracting the alteration width Δ from the current output rate OR is set as the new output rate OR in the output rate setting circuit 52. On the other hand, if the value (OR−Δ) is equal to or smaller than MINR, the minimum value MINR is set as the new output rate OR in the output rate setting circuit 52.

The comparator 53 compares the count value of the counter 54 for counting the count clocks output from the oscillator 50, with the output rate OR set in the output rate setting circuit 52, and generates a packet output signal if both values are equal to each other. Upon input of the packet output signal, the buffer control circuit 55 controls the buffer memory 41 to read out data of one packet, and outputs the read-out data to the system decoder 13 and the time stamp take-out circuit 11. The read-out (output) operation of the data from the buffer memory 41 is carried out in accordance with the output rate OR set in the output rate setting circuit 52 as described above.

As described above, if the number of packets stored in the buffer memory 41 increases, the output rate OR is also set to a larger value in accordance with the increase of the number of packets. On the other hand, if the number of the packets is reduced, the output rate OR is also adjusted to a smaller value.

Accordingly, even when delay fluctuation occurs on the network 3, the delay fluctuation can be absorbed by the adjustment circuit 31. Therefore, the construction of the PLL circuit 12 can be simplified, and a requirement of suppressing delay distortion occurring on the network 3 as much as possible can be moderated.

Next, another embodiment according to the present invention will be described. In order to clarify the corresponding relationship between the respective means of the present invention as described in the claims and the following embodiments, the features of the presents invention will be described hereunder while adding the corresponding embodiments (one embodiment for each means) in parentheses subsequent to each means.

That is, the encode system as claimed in claim 11 comprises encode means (for example, an encoder 1 shown in FIG. 4) for encoding data at a variable bit rate, generating means (for example, a time stamp generating circuit 181 shown in FIG. 4) for generating a time stamp to be added to data), packetting means (for example, a packetting circuit 182 shown in FIG. 4) for adding time stamps to the encoded data to packet the data, calculating means (for example, an interval detector 185 shown in FIG. 4) for calculating the interval of the packet which is packeted by the packetting means, and transmission means (for example, a synthesizing circuit 184 shown in FIG. 4) for transmitting the packet packeted by the packetting means and interval data of the interval calculated by the calculating means.

The decode system as claimed in claim 12 comprises storing means (for example, buffer memories 141A and 141B shown in FIG. 7) for storing data of a variable bit rate which are transmitted on a packet basis, interval data detection means (for example, an interval detection circuit 161 shown in FIG. 7) for detecting interval data of the interval of packets which are transmitted together with data, and delay time control means (for example, a delay time control circuit 163 shown in FIG. 7) for controlling a delay time from the time when the packet is stored in the storing means until the time when it is read out, in accordance with the detection result of the interval data detection means.

In the decode system as claimed in claim 13, the storing means is provided with first storing means (for example, a buffer memory 141A shown in FIG. 7 or the like) for storing plural packets and second storing means (for example, a buffer memory 141B shown in FIG. 7 or the like) for storing a packet read out from the first storing means, and the delay time control means may control the first and second storing means so that the total time of the delay time of the first storing means and the delay time of the second storing means is equal to a predetermined time.

The decode system as claimed in claims 14 and 15 is further provided with storage amount detection means (for example, a counter 143 shown in FIG. 7 or the like) for detecting the amount of packets stored in the storing means, and output rate control means (for example, an output rate control circuit 155 shown in FIG. 7 or the like) for controlling the output rate at which the packet is read out and output from the storing means, in accordance with the detecting result of the storage amount detection means.

Figure 11:
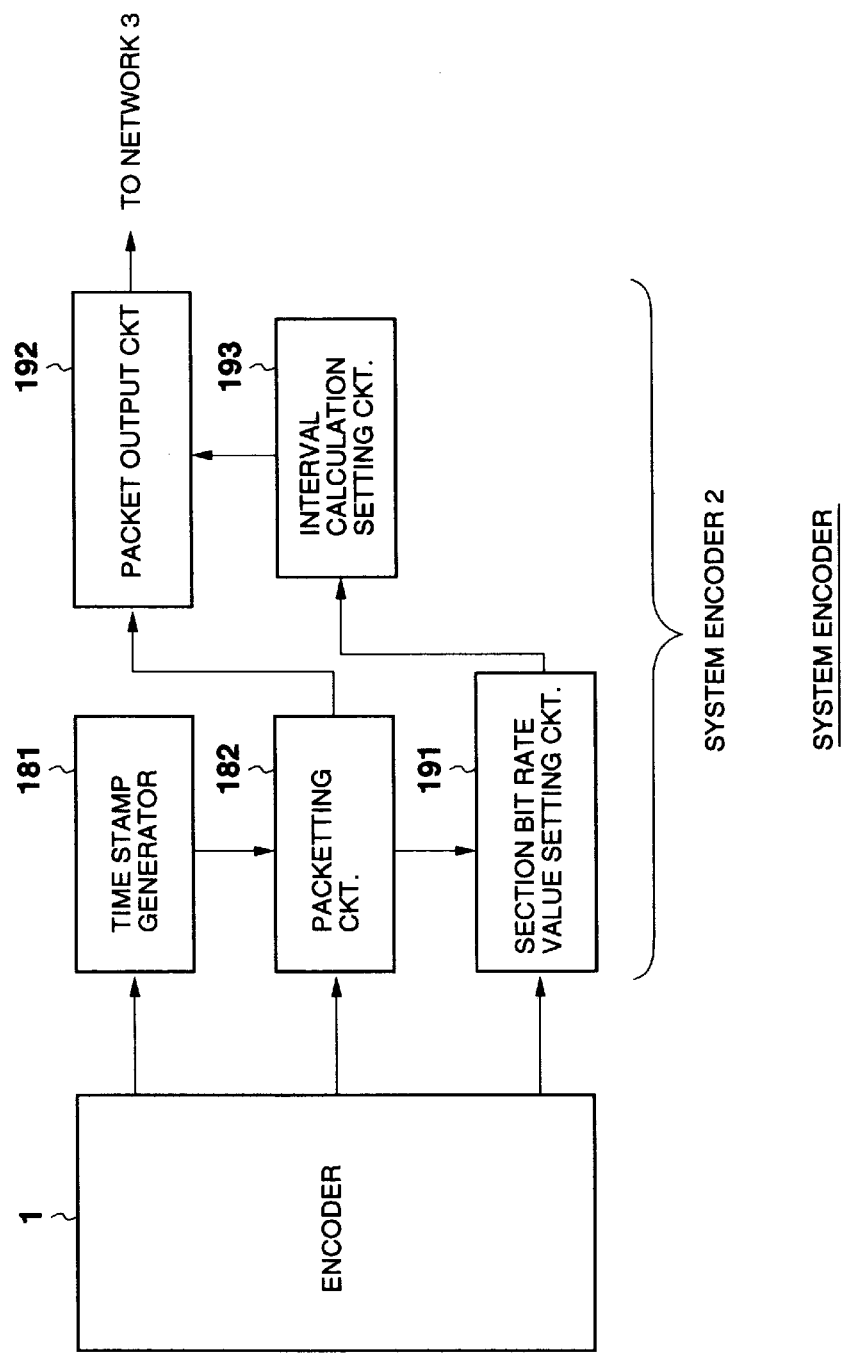
FIG. 11 is a block diagram showing another construction of the system encoder according to the present invention.

The encode system as claimed in claim 18 comprises encode means (for example, an encoder 1 shown in FIG. 11) for encoding data at a variable bit rate, generating means (for example, a time stamp generating circuit 181 shown in FIG. 11) for generating a time stamp to be added to data, packetting means (for example, a packetting circuit 182 shown in FIG. 11) for adding the encoded data with time stamps to packet the data, setting means (for example, a section bit rate value setting circuit 191 shown in FIG. 11) for setting a data rate for packet transmission every predetermined section, calculating means (for example, an interval calculating and setting circuit 193 shown in FIG. 11) for calculating a transmission interval of the packet in accordance with the data rate, and transmitting means (for example, a packet outputting circuit 192 shown in FIG. 11) for transmitting data rate data of the data rate and the packet at the transmission interval calculated by the calculating means.

The encode data recording device as claimed in claim 20 comprises storing means (for example, a buffer 211 shown in FIG. 12) for storing input data which are encoded at a variable bit rate and added with time stamps to be packeted and the data rate data of the data rate at which the packet is transmitted, and recording means (for example, a recording circuit 212 shown in FIG. 12) for reading out the data stored in the storing means and recording the read-out data onto a recording medium.

Figure 14:
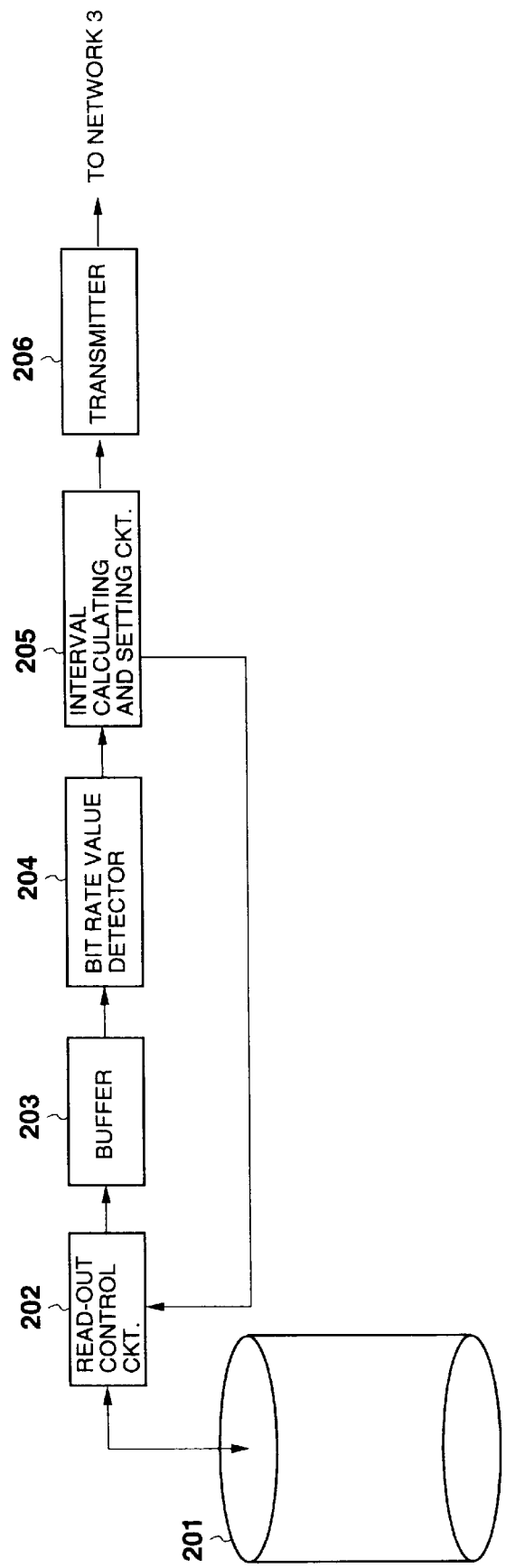
FIG. 14 is a block diagram showing the construction of an encode data transmitting device of the present invention.

The encode data transmission device as claimed in claim 22 comprises read-out means (for example, a read-out control circuit 202 shown in FIG. 14) for reading out data from a recording medium on which encoded data which are encoded at a variable bit rate and added with a time stamp to be packeted are recorded together with data rate data of a data rate at which the packet is transmitted, detection means (for example, a bit rate detector 204 shown in FIG. 14 or the like) for detecting the data rate data from the data, calculating means (for example, an interval calculating and setting circuit shown in FIG. 14) for calculating a packet transmission interval in accordance with the data rate data, and transmitting means (for example, a transmitter 206 shown in FIG. 14) for transmitting the packet together with the data rate data at the transmission interval calculated by the calculating means.

It is needless to say that the respective means of the present invention are not limited to the above respective parts.

Figure 4:
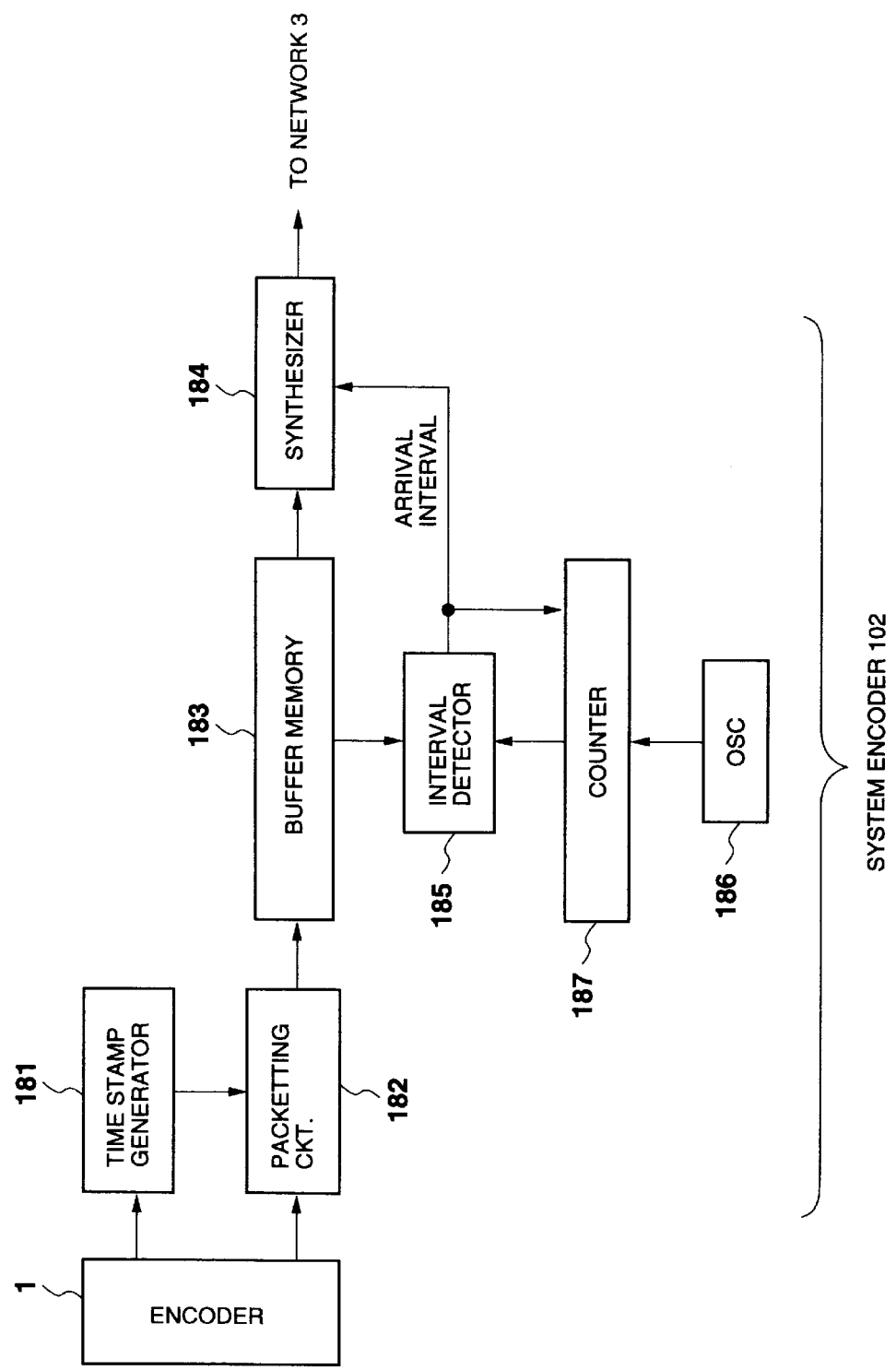
FIG. 4 is a block diagram showing the construction of a system encoder according to the present invention.

FIG. 4 shows the construction of the system encoder 10 which constitutes the encode system of another embodiment of the present invention. In this embodiment, the data transmission system is designed in the same construction as shown in FIG. 15. The encode system comprises an encoder 1 and a system encoder 102, and the system encoder 102 is designed as shown in FIG. 4.

In this embodiment, the encoded video data and audio data which are supplied from the encoder 1 are input to a packetting circuit 182 and packeted. The time stamp generating circuit 181 generates information (time information) corresponding to an encode time which is output from the encoder 1, for example, a time stamp, and outputs it to the packetting circuit 182. The packetting circuit 182 adds the time stamp to the header of the packet.

After the packeted data output from the packetting circuit 182 is supplied to a buffer memory 183 having a packet size and stored, the packeted data are read out again and then transmitted through the synthesizing circuit 184 to the network 3. When data of one packet are stored in the buffer memory 183, an interval detector 185 receives a detection signal representing the above data storage.

A counter 187 counts a clock output from an oscillator (OSC) 186 and outputs the count value to the interval detector 185. When receiving the signal representing that the data of one packet are stored from the buffer memory 183, the interval detector 185 takes in the count value held by the counter 187 at that time as data representing the interval of the packet (since the packet length is fixed, data representing the packet interval (interval data) may be regarded as corresponding to the data rate at which the packet is transmitted), and outputs the count value to the synthesizing circuit 184. The synthesizing circuit 184 outputs the interval data onto the network 3.

When the interval detector 185 outputs the interval data, the counter 187 is reset, and starts its counting operation of the timing until data of next one packet are stored in the buffer memory 183.

As described above, in this embodiment, the video data and the audio data which are encoded by the encoder 1 are packeted in the system encoder 102, and then transmitted onto the network 3. In addition, the interval data are transmitted onto the network 3.

Figure 5:
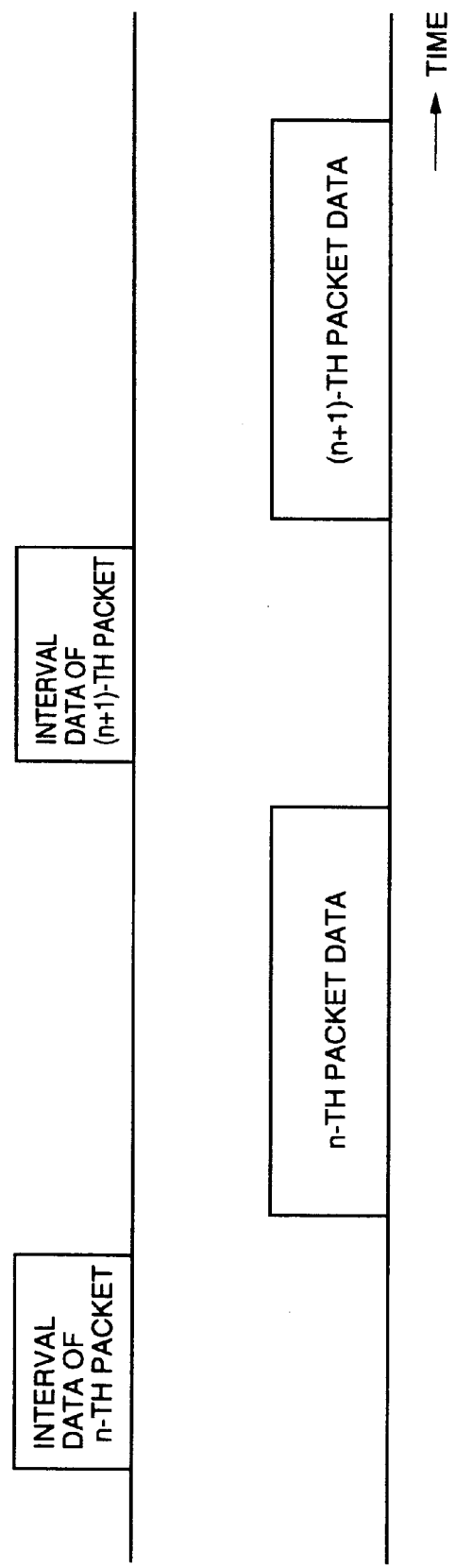
FIG. 5 is a timing chart showing the relationship between packets output from a synthesizing circuit 84 of FIG. 4 and interval data.

FIG. 5 shows the time relationship between the packet data which are synthesized and output by the synthesizing circuit 184 and the interval data of the packet. As shown in FIG. 5, the interval data of an n-th packet are transmitted prior to the data of the n-th packet.

In this embodiment, the interval data are transmitted onto the network 3 as data of a channel (format) different from the packeted data. However, the interval data may be packeted like the time stamp and then transmitted.

As described above, the data transmitted to the network 3 are supplied to the system decoder 104, and the system clock is generated like the prior art as shown in FIG. 15.

Figure 6:
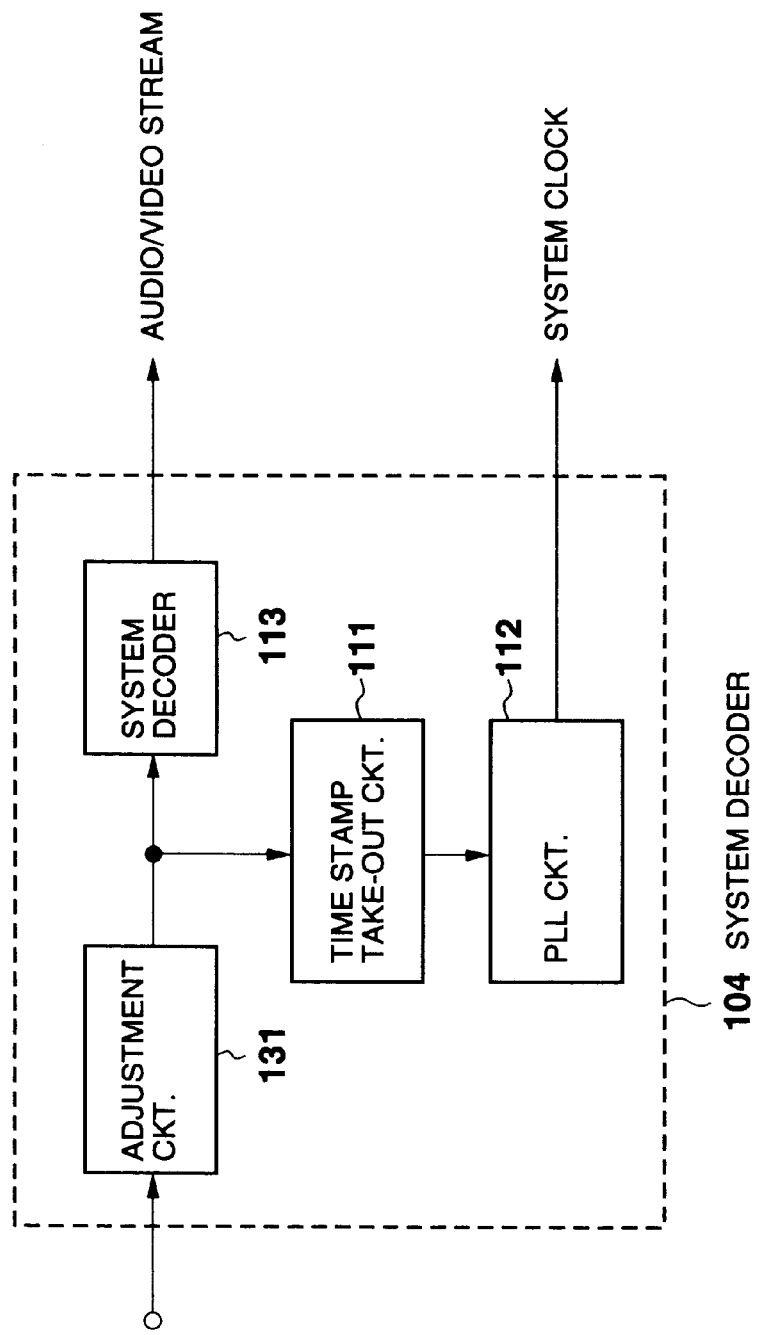
FIG. 6 is a block diagram showing the construction of a system decoder according to the present invention.

FIG. 6 shows the construction of the system decoder 104. As shown in FIG. 6, the data transmitted from the network 3 are input to an adjustment circuit 131 to be subjected to an adjustment processing for the variation of the packet interval and the delay fluctuation. Thereafter, the data are input to the system decoder 113 to be decomposed into an audio stream and a video stream, and then supplied to the decoder 5.

Figure 17:
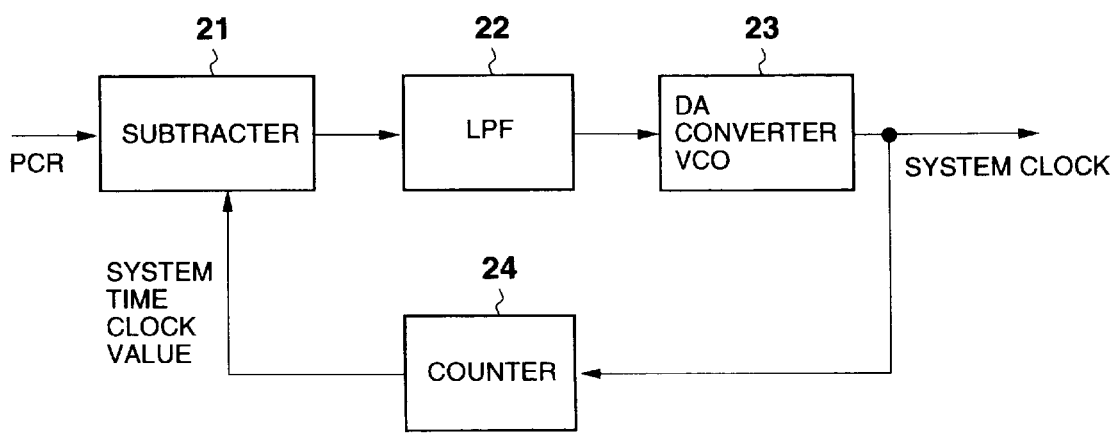
FIG. 17 is a block diagram showing the construction of a PLL circuit 12 of FIG. 16.

The time stamp take-out circuit 111 takes out the time stamp from the output of the adjustment circuit 131, and then output to the PLL circuit 112. The PLL circuit 112 is designed in the same construction as shown in FIG. 17, generates the system clock on the basis of the time stamp and then outputs it to the decoder 5.

Figure 7:
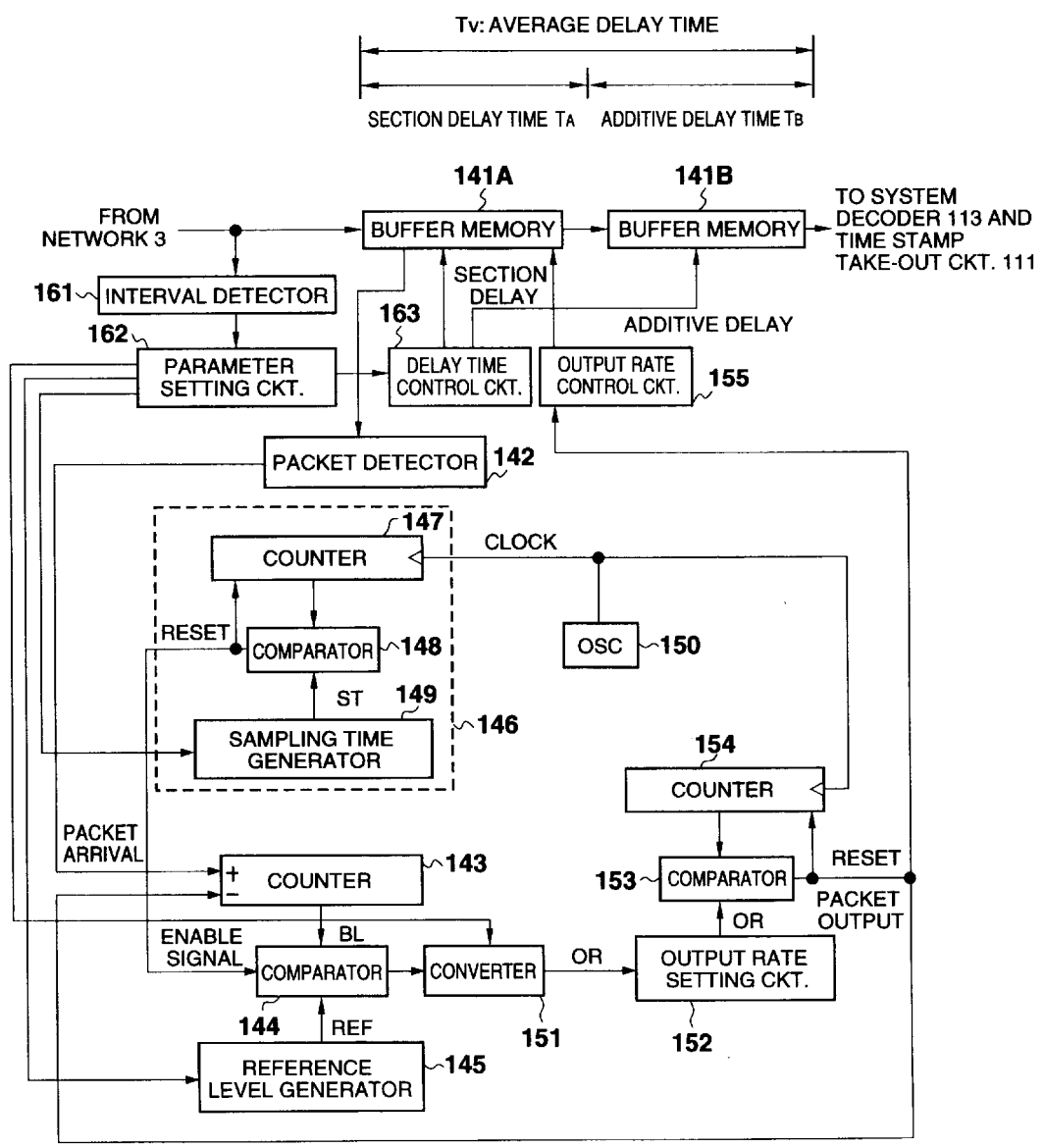
FIG. 7 is a block diagram showing the construction of an adjustment circuit 31 of FIG. 6.

FIG. 7 shows the construction of the adjustment circuit 131. The packeted data which are transmitted through the network 3 are input to and temporarily stored in a buffer memory 141a. Thereafter, the data are read out again and supplied to a buffer memory 141B to be stored. Thereafter, the data are read out and output to the system decoder 113, etc. The buffer memory 141A has capacity corresponding to plural integer number of packets (that is, it is designed to store plural integer number of packets), and the buffer memory 141B has capacity corresponding to the packet size (capacity of one packet).

An interval detection circuit 161 detects interval data from data transmitted from the network 3, and outputs the detection output to a parameter setting circuit 162. In accordance with the detected interval data, the parameter setting circuit 162 sets a section delay time and an additive delay time of a delay time control circuit 163, a sampling time ST to detect a storage amount of packets of the buffer memory 141A in a sampling time generator 149, a reference level REF in a reference level generator 145, the output rate OR of a converter 151, the maximum value MAXR of the output rate, the minimum value MINR of the output rate, the alteration width Δ of the output rate, etc. to predetermined values.

The packet detector 142 detects that data of one packet are stored in the buffer memory 141A, and supplies its detection pulse to the addition input terminal of the counter 143. The substraction input terminal of the counter 143 is supplied with a packet output pulse which is output from a comparator 153. The counter 143 increments its count value by "1" every time the pulse is input from the packet detector 142, and decrements its count value by "1" every time the pulse is input from the comparator 153.

The counter 147 of the timing signal generating circuit 146 counts the clock output from the oscillator (OSC) 150, and outputs the count value to the comparator 148. The comparator 148 compares the count value of the counter 147 with the output of the sampling time generator 149, and outputs an enable signal to the comparator 144 if both the values are equal to each other. The counter 147 is reset on the basis of the enable signal.

The comparator 144 compares the count value of the counter 143 and the reference level of the reference level generator 145, and outputs the comparison result to the converter 151.

The converter 151 calculates the output rate OR on the basis of the output of the comparator 144, and sets the calculation result to the output rate setting circuit 152. The counter 154 counts the clock output from the oscillator 150, and outputs its count value to the comparator 153. The comparator 153 compares the output of the output rate setting circuit 152 and the count value of the counter 154, and if both values are equal to each other, the comparator 153 outputs the packet output pulse to the subtraction input terminal of the counter 143 and also to the output rate control circuit 155.

The output rate control circuit 155 controls the buffer memory 141A to output the data of one packet from the buffer memory 141A when the packet output pulse is input to the output rate control circuit 155. The counter 154 is reset on the basis of the packet output pulse which is output from the comparator 153.

Next, the operation of the embodiment shown in FIG. 7 will be described with reference to flowcharts of FIGS. 8 and 9.

The data which are input on a packet basis from the network 3 are stored in the buffer memory 141A and delayed by a predetermined time (only a section delay time $T_A$), and then the data are read out from the buffer memory 141A and stored in the buffer memory 141B. After the data are delayed by an additive delay time $T_B$ in the buffer memory 141B, and then the data are read out from the buffer memory 141B, and supplied to the system decoder 113 and the time stamp take-out circuit 111.

The section delay time $T_A$ and the additive delay time $T_B$ in the buffer memories 141A and 141B and the output rate (read-out rate OR) are controlled on the basis of the interval data which are transmitted through the network 3 together with the packeted data as follows.

That is, the interval detection circuit 161 detects that the interval data are transmitted through the network 3, and outputs the detection signal to the parameter setting circuit 162. The parameter setting circuit 162 detects the interval data to execute processing shown in FIG. 8.

First, in step S1, the parameter setting circuit 162 goes to step S2 when receiving the interval data, and calculates the section delay time $T_A$ according to the following calculation.

$$T_A = (\text{INT}[d/T]+0.5) \times T \tag{1}$$

Here, INT[ ] represents an integer of a calculation value (a calculation value obtained by omitting the figures below the first place of decimals) within [ ], and d represents a constant which corresponds to a time interval at which the number of packets stored in the buffer memory 141A is sampled. T represents the interval time (arrival interval time) of the packets which is detected on the basis of the interval data.

The parameter setting circuit 162 calculates the section delay time $T_A$ according to the above equation, and outputs the delay time to the delay time control circuit 163. The delay time control circuit 163 controls the buffer memory 141A so that the delay time between the times when the data of one packet are input to the buffer memory 141A and when the data are output from the buffer memory 141A is equal to the section delay time $T_A$.

Subsequently, the process goes to step S3 to calculate the additive delay time $T_B$ in the buffer memory 141B according to the following equation.

$$T_B = T_V - T_A \tag{2}$$

Here, $T_V$ represents a delay time (average delay time) which is preset as a total delay time of the section delay time $T_A$ in the buffer memory 141A and the additive delay time $T_B$ in the buffer memory 141B, and it is a constant which is defined by the following equation:

$$T_V = d + T_{MAX}/2 \tag{3}$$

$T_{MAX}$ represents the maximum value of the interval T.

The additive delay time $T_B$ is output to the delay time control circuit 163. The delay time control circuit 163 controls the buffer memory 141B so that the time period from the time when the data are input to the buffer memory 141B until the time when the data are read out from the buffer memory 141B is equal to the additive delay time $T_B$. That is, the delay time control circuit 163 controls the buffer memory 141B on the basis of the section delay time $T_A$ and the additive delay time $T_B$ Of the buffer memories 141A and 141B so that the total delay time is equal to the average delay time $T_V$.

The parameter setting circuit 162 calculates the sampling time ST in the sampling time generator 149 according to the following equation:

$$ST = T_A + d \tag{4}$$

When calculating the sampling time ST, the parameter setting circuit 162 outputs and sets the calculation value to the sampling time generator 49.

Furthermore, the parameter setting circuit 162 calculates the output rate (read-out rate) OR in the buffer memory 141a according to the following equation:

$$OR = 1/T \tag{5}$$

In addition, the parameter setting circuit 162 calculates the maximum value MAXR and the minimum value MINR of the output rate OR and the value of the alteration width Δ are calculated in accordance with the arrival interval time T.

The output rate OR, the maximum value MAXR and the minimum value MINR and the alteration width Δ thus obtained are supplied to the converter 151. The converter 151 calculates a prescribed output rate from the output of the comparator 144 according to the parameters thus set, and outputs it to the output rate setting circuit 152. The details of this processing will be described later.

As described above, after the processing of the step S3 is completed, in step S4 the parameter setting circuit 162 receives the interval data (interval time T) which is newly output from the interval detection circuit 161, and in step S5 it judges whether the newly-detected interval time T varies to a value different from the just-before interval time T. If the new interval time T is judged to be equal to the just-before interval time T, the process goes to step S6 to calculate the sampling time ST according to the following equation:

$$ST = d \qquad (6)$$

The sampling time ST thus set is output and set to the sampling time generator 149. With this operation, the comparator 148 outputs the enable signal to the comparator 144 every time the value of the counter 147 is equal to a fixed value (value corresponding to d).

The output rate OR, the section delay time $T_A$, the additive delay time $T_B$, the maximum value MAXR, the minimum value MINR and the alteration width Δ are not altered, and they are continually used.

The process returns to step S4 subsequently to the step S6, and repetitively executes the subsequent processing.

On the other hand, if the interval time T is judged to vary to the value different from the just-before interval time T in S5, the process goes to step S7. The processing of the step S7 is basically identical to that of the steps S2 and S3. That is, like the steps S2 and S3, the section delay time $T_A$ and the output rate OR are calculated according to the following equation:

$$T_A = (1NT([d/T] + 0.5) \times T \qquad (7)$$

$$OR = 1/T \qquad (8)$$

The maximum MAXR, the minimum value MINR and the alteration width Δ are also calculated in accordance with the new interval time T. However, the additive delay time $T_B$ is calculated according to the following equation:

$$T_B = T_{AN} - T_{AO} \qquad (9)$$

Here, $T_{AN}$ represents a newly calculated section delay time $T_A$, and $T_{AO}$ represents a section delay time $T_A$ which has been used until now.

The sampling time ST is calculated according to the following equation like the step S6:

$$ST = d \qquad (10)$$

The process returns to the step S4 subsequently to the step S7, and the subsequent processing is repeated.

As described above, the section delay time $T_A$ and the additive delay time $T_B$ of the buffer memories 141A and 141B are suitably controlled in accordance with the interval time T by the delay time control circuit 163, and the sampling time ST of the sampling time generator 149, the output rate OR, the maximum value MAXR, the minimum value MINR and the alteration width Δ of the converter 151 are altered to prescribed values in accordance with the interval time T, and this processing is repetitively executed.

Here, the section delay time $T_A$ and the additive delay time $T_B$ will be described in detail by using specific numerical values.

It is now assumed that data of 10 Mbps arrive at the buffer memory 141A at an interval of 3 seconds or data of 3 Mbps arrive at the buffer memory 141A at an interval of 10 seconds. The interval d at which the input of data of one packet into the buffer memory 141A is detected by the packet detector 142 (a time-converted value of the count value of the counter 147) is assumed to be 34 seconds. In this case, the count value BL of the counter 143 (the number of packets stored in the buffer memory 141A) is represented by the following equation:

$$BL = INT[d/T] \qquad (11)$$

Since the count value BL of the counter 143 is an integer, BL is equal to 11 when the data of 10 Mbps are input, and BL is equal to 3 when the data of 3 Mbps are input. Accordingly, the section delay time $T_A$ in the buffer memory 141A is equal to 34.5 seconds (=(INT[3/3]+0.5)×3) according to the equation (1).

The buffer memory 141B at the subsequent stage of the buffer memory 141A serves to absorb the variation of the section delay time $T_A$ of the buffer memory 141A and make the average delay time $T_V$ constant, and thus it is sufficient to enable the buffer memory 141B to achieve an adjustment of ½ of the maximum value of the interval of the arriving data. In the above case, the maximum value is equal to 10 seconds (the interval is equal to 10 seconds or 3 seconds), and the buffer memory 141B may merely achieve an adjustment of 5 seconds (=10/2). Therefore, the average delay time tv is equal to 39 seconds (=34+5) according to the equation (3). Accordingly, the additive delay time $T_B$ is equal to 4.5 seconds (=39−34.5).

On the other hand, when the data of 3 Mbps are input, the section delay time $T_A$ is equal to 35 seconds (=(INT[34/10]+0.5)×10), and the additive delay time $T_B$ is equal to 4 seconds (=39−35).

As described above, the section delay time $T_A$ of the buffer memory 141A is controlled in accordance with the number (integer) of the packets stored in the buffer memory 141A, however, data whose number is above the detected number (integer) are actually stored in the buffer memory 141a. The actual data are delayed by a delay time which is defined by an integer, so that the delay time of the actual data in the buffer memory 141A is different from the section delay time $T_A$. Therefore, the actual data are further delayed by the additive delay time $T_B$ by the subsequent buffer memory 141B to set the total delay time the fixed value of the average delay time $T_V$.

Figure 9:
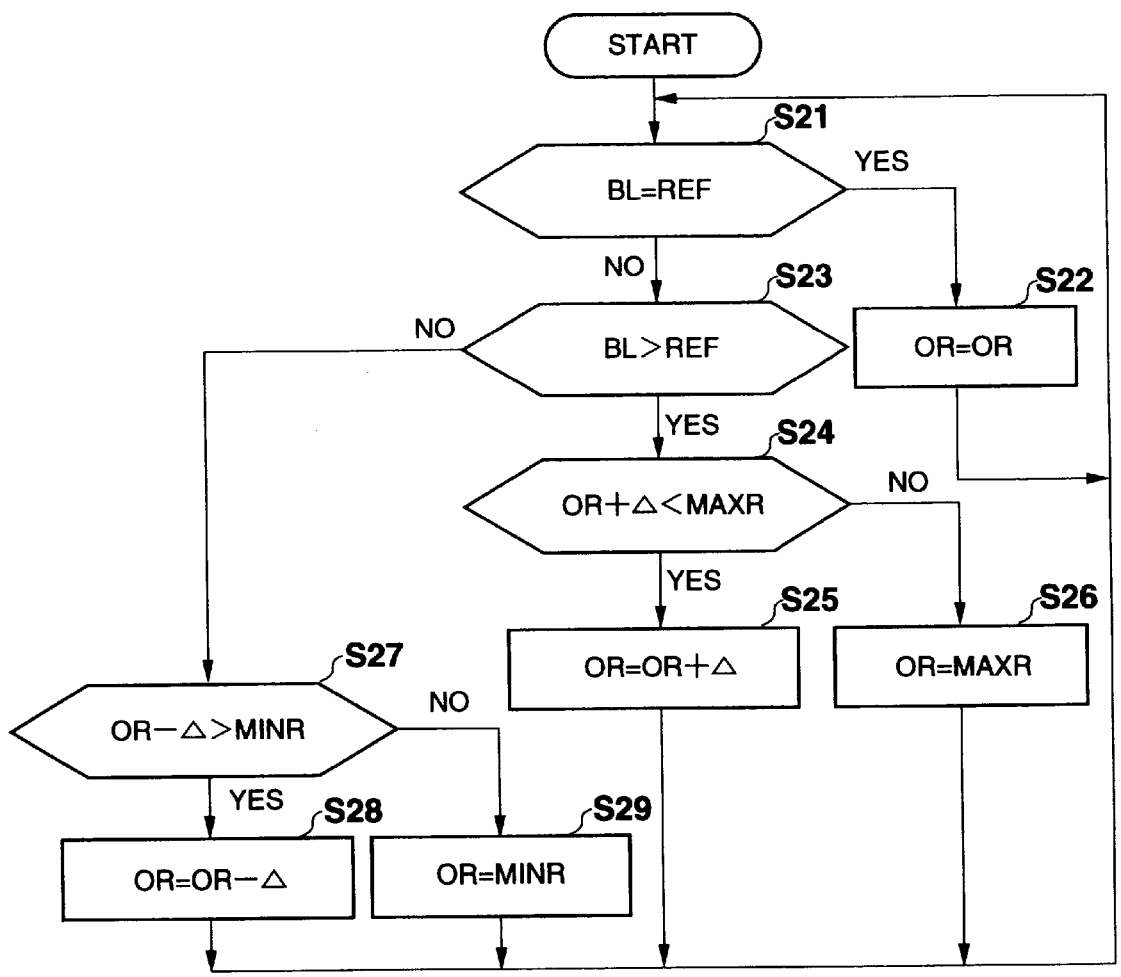
FIG. 9 is a flowchart for another operation of the embodiment of FIG. 7.

In parallel to the processing of setting these parameters to predetermined values as described above, the comparators 144, 148 and 153, etc. perform the processing shown in FIG. 9.

When the packet detector 142 detects that the data of one packet are stored in the buffer memory 141A, the counter 143 counts up its detection pulse to be output. When the comparator 153 outputs the packet output pulse to the output rate control circuit 155 to instruct the read-out (output) of the data of one packet stored in the buffer memory 141A, the comparator 153 counts up its packet output pulse to be output. As a result, the value corresponding to the number of packets stored in the buffer memory 141A is held in the counter 143.

The comparator 148 compares the count value of the counter 147 with the sampling time ST set in the sampling time generator 149, and outputs the enable signal to the comparator 144 when the count value is equal to the sampling time ST. The counter 147 is reset when the comparator 148 outputs the enable signal, and starts the count operation of the clock output from the oscillator 150 again. The above operation is repeated, so that the comparator 148 of the timing signal generating circuit 146 generates the enable signal at a constant period (a period corresponding to the sampling time ST set in the sampling time generator 149).

In step S21, the comparator 144 compares the count value (BL) of the counter 143 with the reference level (REF) set in the reference level generator 145 at the timing at which the comparator 148 of the timing signal generating circuit 146 outputs the enable signal.

When the comparator 144 judges that the count value BL of the counter 143 is equal to the reference level REF of the reference level generator 145, the process goes to step S22 in which the converter 151 keeps the output rate OR set in the output rate setting circuit 152 to be the current output rate OR. Thereafter, the process returns to the step S21 to repeat the subsequent processing.

On the other hand, if in step S21 the counter value BL is judged not to be equal to the reference level REF of the reference level generator 145, the process goes to step S23 to judge whether the count value BL is larger than the reference level REF.

If the count value BL is judged to be larger than the reference level REF, the process goes to step S24 to judge whether the sum value (OR+Δ) of the output rate FOR set in the output rate setting circuit 152 and the alteration width Δ set at that time is smaller than the maximum value MAXR of the output rate set at that time. If the value (OR+Δ) is smaller than MAXR, the process goes to step S25 to set the sum value (OR+Δ) of the current output rate OR and the alteration width Δ as a new output rate OR. On the other hand, if the value (OR+Δ) is equal to or larger than MAXR, the process goes to step S26 to set the maximum value MAXR as the output rate OR.

That is, when the value output from the comparator 144 is positive (the count value BL of the counter 43 is larger than the reference level REF), the converter 151 outputs to the output rate setting circuit 152 the output rate which is larger by the alteration width Δ. With this operation, in the output rate setting circuit 152, the output rate OR which has been set until that time is altered to a value which is increased by the alteration width Δ.

If the value (OR+Δ) is equal to or larger than MAXR, the converter 151 sets the maximum value MAXR as the output rate in the output rate setting circuit 152.

On the other hand, if in step S23 it is judged that the count value BL is equal to or smaller than the reference level REF, the process goes to step S27 to judge whether the subtraction value (OR−Δ) obtained by subtracting the alteration width Δ from the output rate OR is larger than the minimum value MINR of the output rate. If the value (OR−Δ) is judged to be larger than MINR, the process goes to step S28 to set as the new output rate OR the value (OR−Δ) which is obtained by subtracting the alteration width Δ from the current output rate OR.

If in step S27 the value (OR−Δ) is equal to or smaller than the MINR, the process goes to step S29 to set the minimum value MINR as the new output rate OR.

That is, if the counter value BL is equal to or smaller than the reference level REF, the converter 151 judges whether the value obtained by subtracting the alteration width Δ from the current output rate OR is larger than MINR. If the value (OR−Δ) is larger than MINR, the value obtained by subtracting the alteration width Δ from the current output rate OR is set as the new output rate in the output rate setting circuit 152. On the other hand, if the value (OR−Δ) is equal to or smaller than the MINR, the minimum value MINR is set as the new output rate OR in the output rate setting circuit 152.

The comparator 153 compares the count value of the counter 154 for counting the clock output from the oscillator 150 with the output rate OR set in the output rate setting circuit 152, and it outputs the packet output pulse when both values are equal to each other. When the packet output pulse is input, the output rate control circuit 155 controls the buffer memory 141A to read out the data of one packet and output the data to the buffer memory 141B.

As described above, the data read out (output) operation from the buffer memory 141A is carried out in accordance with the output rate OR set in the output rate setting circuit 152.

As described above, if the number of the packets stored in the buffer memory 141A increases, the output rate OR is also adjusted to a larger value. If the number of the packets is reduced, the output rate OR is also adjusted to a smaller value.

Accordingly, even when the packet arrival interval varies and the delay fluctuation occurs on the network, these can be absorbed by the adjustment circuit 131. As a result, the PLL circuit 112 can be simplified in construction, and the requirement of suppressing the delay fluctuation as much as possible for the network 3 can be moderated.

In the embodiment as described above, the data representing the interval of the packets are transmitted as the interval data. However, the packet interval and the data rate (bit rate) at which the packet is transmitted correspond to each other, and thus data representing the data rate can be transmitted as the interval data. In this case, the interval detector 161 may be designed to detect the interval data representing the data rate (hereinafter referred to as "data rate data") and calculate the packet interval on the basis of the recognized data rate. That is, in a case where an interval when the packet is transmitted at a data rate of x1 [Mbps] is equal to y1 [second], the interval detector 161 may be designed to calculate the packet interval according to the equation of y1×x1/x2 when x2 [Mbps] is received as the data rate data.

Furthermore, in the embodiment as described above, as shown in FIG. 5, the interval data are transmitted before each packet is transmitted. However, the interval data (or data rate data) may be transmitted only when the interval data are different from interval data (data rate data) transmitted just before.

That is, the coding of the encoder 1 is carried out at a fixed rate if it is considered as being divided every predetermined section (time). The data rate (bit rate) of each section is varied in accordance with a generation code amount in the encoder 1. That is, in a section where the generation code amount in the encoder 1 is large, the data rate is increased (accordingly, the number of packets to be transmitted is increased and thus the packet interval is shortened). In a section where the generation code amount is small, the data rate is reduced (accordingly, the number of packets to be transmitted is small, and thus the packet interval is lengthened) (as described above, the data rate is varied every prescribed section, and thus the data rate is variable as a whole).

Figure 10:
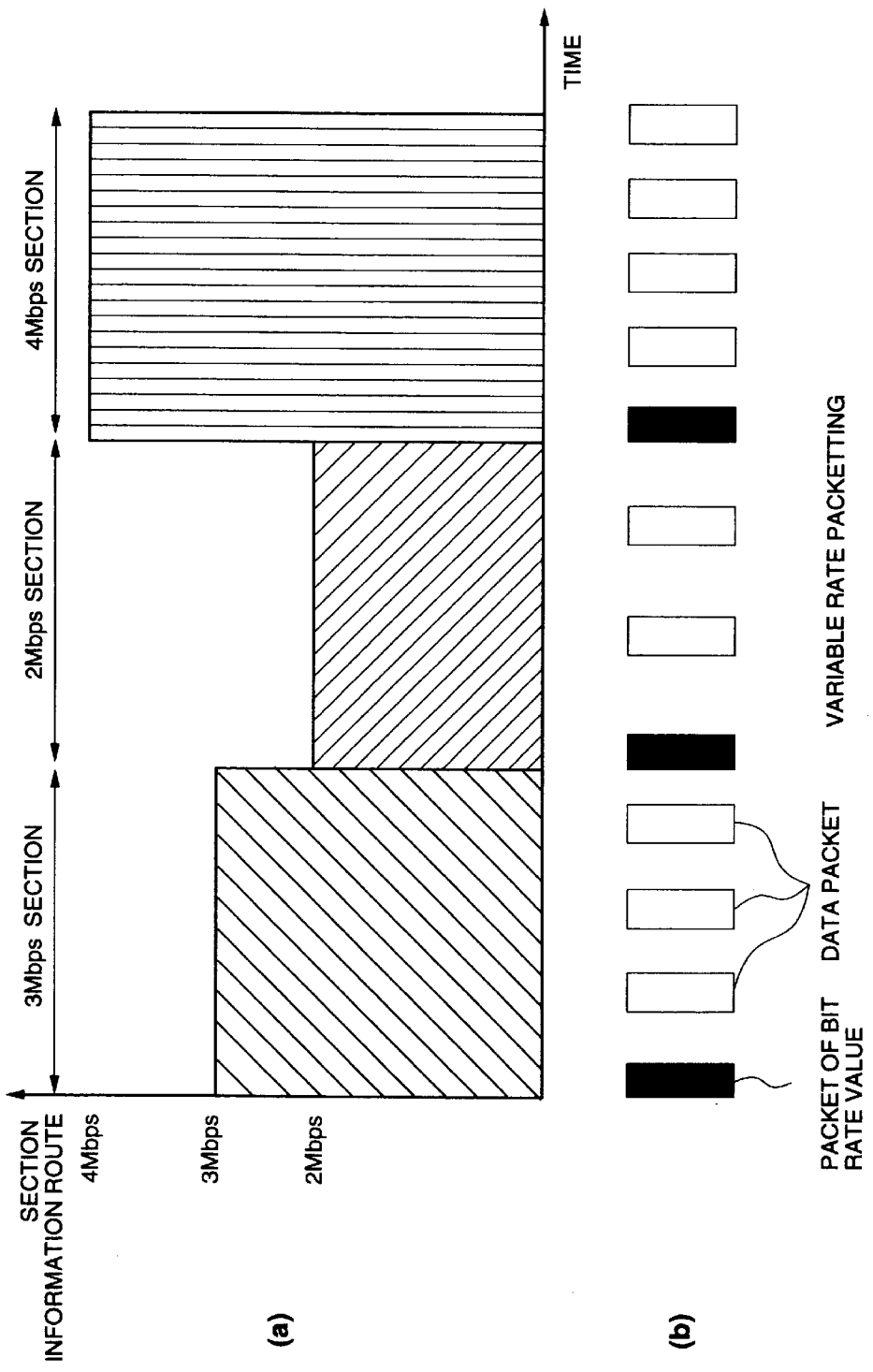
FIG. 10 is a diagram showing an aspect that a coding operation in the encoder 1 is carried out at a fixed rate, in which an upper stage (a) of FIG. 10 shows variation of the fixed rate with time and a lower stage (b) of FIG. 10 shows packet intervals of various packets which are coded at different fixed rates as shown in (a) of FIG. 10.

FIG. 10 shows an aspect that the coding of the encoder 1 is carried out at a fixed rate every prescribed section. At an upper stage (a) of FIG. 10, the coding is carried out at 3 Mbps in a first section, at 2 Mbps in a second section and at 4 Mbps in a subsequent section. As shown in a lower stage (b) of FIG. 10, the packet interval is shortened in a section where the data rate is high, for example, in the section of 4 Mbps, and the packet interval is lengthened in a section where the data rate is low, for example, in the section of 2 Mbps.

In this case, since the data rate of each section is fixed, the following transmission operation can be performed: a packet (data rate value packet) having data rate data corresponding to the data rate for transmission of the data of the section are transmitted only before the data of each section are transmitted, and then the packeted data are transmitted at the interval corresponding to the data rate.

Figure 8:
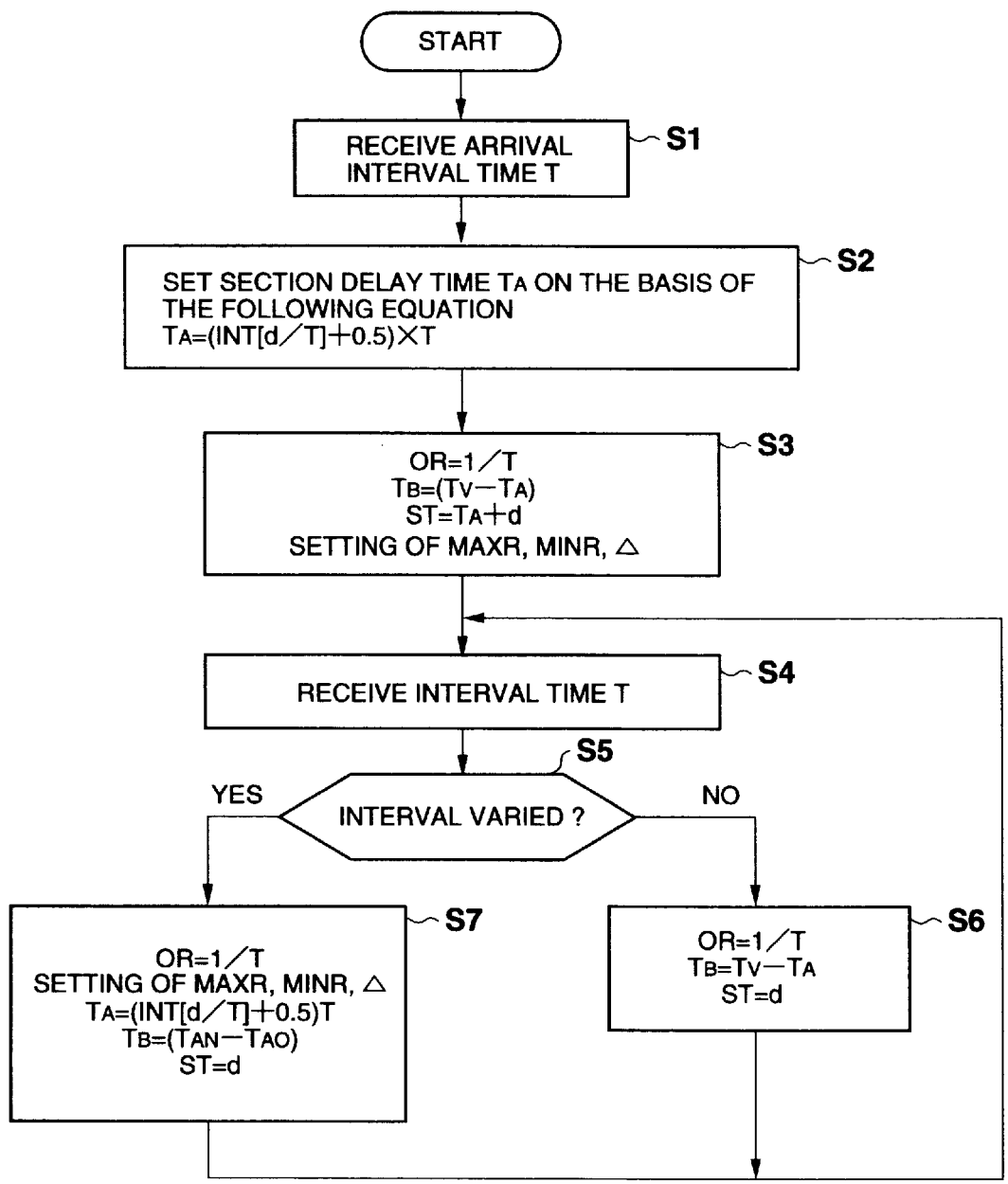
FIG. 8 is a flowchart for an operation of an embodiment of FIG. 7.

In the case of the transmission operation as described above, the above decoding operation can be performed by controlling the parameter setting circuit 162 to perform the processing of the steps S1 to S3 as shown in the flowchart of FIG. 8, and then to perform the processing of the step S7 when it receives the data rate data or to perform the processing of the step S6 when it receives no data rate data.

In this case, the transmission efficiency can be more improved as compared with the case where the data rate data (interval data) are transmitted before each packet is transmitted.

The fixed-rate section may be set in accordance with the type of the data, for example. That is, like the embodiment as described above, when both the video signal and the audio signal are transmitted, the video signal is transmitted (coded) at a fixed rate (for example every 15 frames) while the audio signal is transmitted (coded) at a fixed rate (for example, every 1 second).

FIG. 11 shows the construction of the encoder system for outputting the packets as shown in FIG. 10. In FIG. 11, the same elements as those of FIG. 4 are represented by the same reference numerals, and the description thereof is omitted.

In a section bit rate value setting circuit 191, a rate (data rate) which is set every prescribed section by the encoder 1 as described above and at which data are coded is extracted, and then output to a packetting circuit 182 and an interval calculating and setting circuit 193. When receiving the data rate from the section bit rate value setting circuit 191, the interval calculating and setting circuit 193 calculates the packet transmission interval (the interval of the packets) on the basis of the data rate and outputs it to the packet output circuit 192. When receiving the packet interval from the interval calculating and setting circuit 193, the packet outputting circuit 192 outputs the packet output from the packetting circuit 182 to the network 3 at the interval (the rate at which the packet is output is adjusted in accordance with the interval).

The packetting circuit 182 packets the data rate which is supplied from the section bit rate value setting circuit 191 as the data rate data of the section before the data of each prescribed section which are output from the encoder 1 are packeted, and outputs the packeted data rate to the packet output circuit 192. Accordingly, as shown in the lower stage (b) of FIG. 10, the data rate data (data rate value packet) are first transmitted every section from the packet outputting circuit 192, and then the packet (data packet) of the data (MPEG-coded data in this embodiment) is transmitted at the interval corresponding to the data rate.

In this case, the data rate data can be transmitted while contained in the data packet like the time stamp.

Next, there is a case where data output from the packet outputting circuit 192 are not transmitted on real-time basis, but the data are required to be temporarily stored in a recording medium and then transmitted. In this case, since there is an interval between a packet and a next packet, if the data output from the packet outputting circuit 192 are directly recorded, a surplus recording capacity corresponding to the interval is required.

Figure 12:
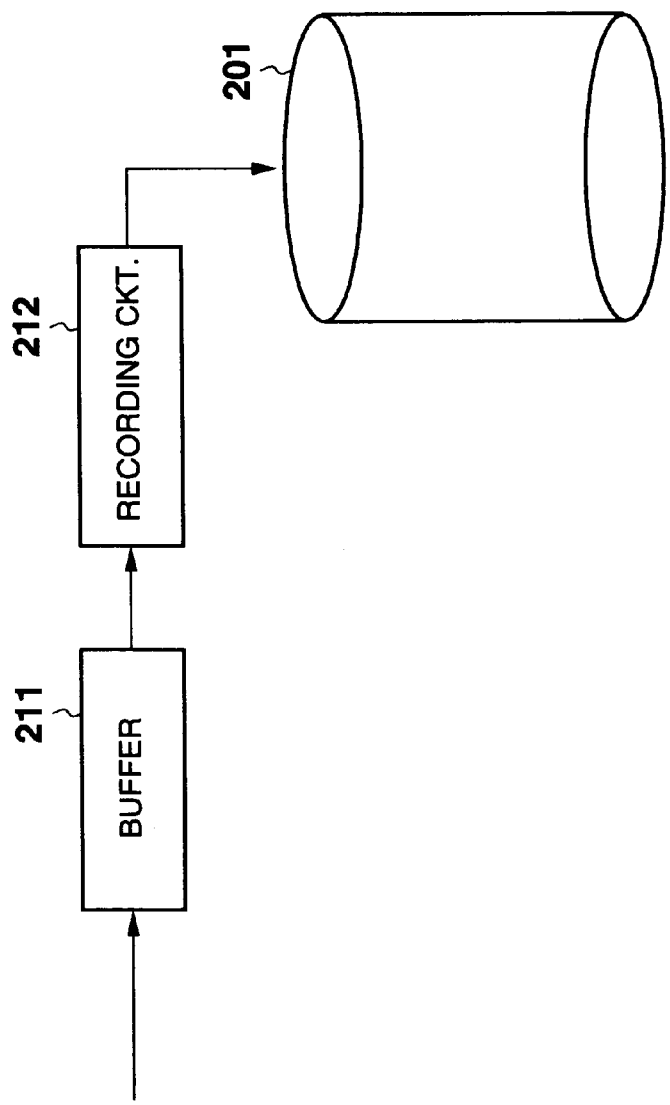
FIG. 12 is a block diagram showing the construction of an encode data recording device of the present invention.

FIG. 12 shows the construction of an embodiment of the encode data recording device of the present invention. A buffer 211 stores therein data output from the packet outputting circuit 192. A recording circuit 212 reads out data stored in the buffer 211, and records the data onto a recording medium 201 such as a hard disc (magnetic disc), a magnetooptical disc, a magnetic tape or the like. The buffer 211 is designed to simultaneously perform a data storing operation and a data read-out operation.

In the encode data recording device thus constructed, the data output from the packet outputting circuit 192 are supplied to and stored in the buffer 211. The recording circuit 212 reads out the data from the buffer 211 while skipping parts of the intervals of the packets, and then records the data onto the recording medium 201. Consequently, data which are encoded at a variable bit rate and added with time stamps to be packeted, are recorded together with the data rate data on the recording medium 201 with no interval between the data.

Figure 13:
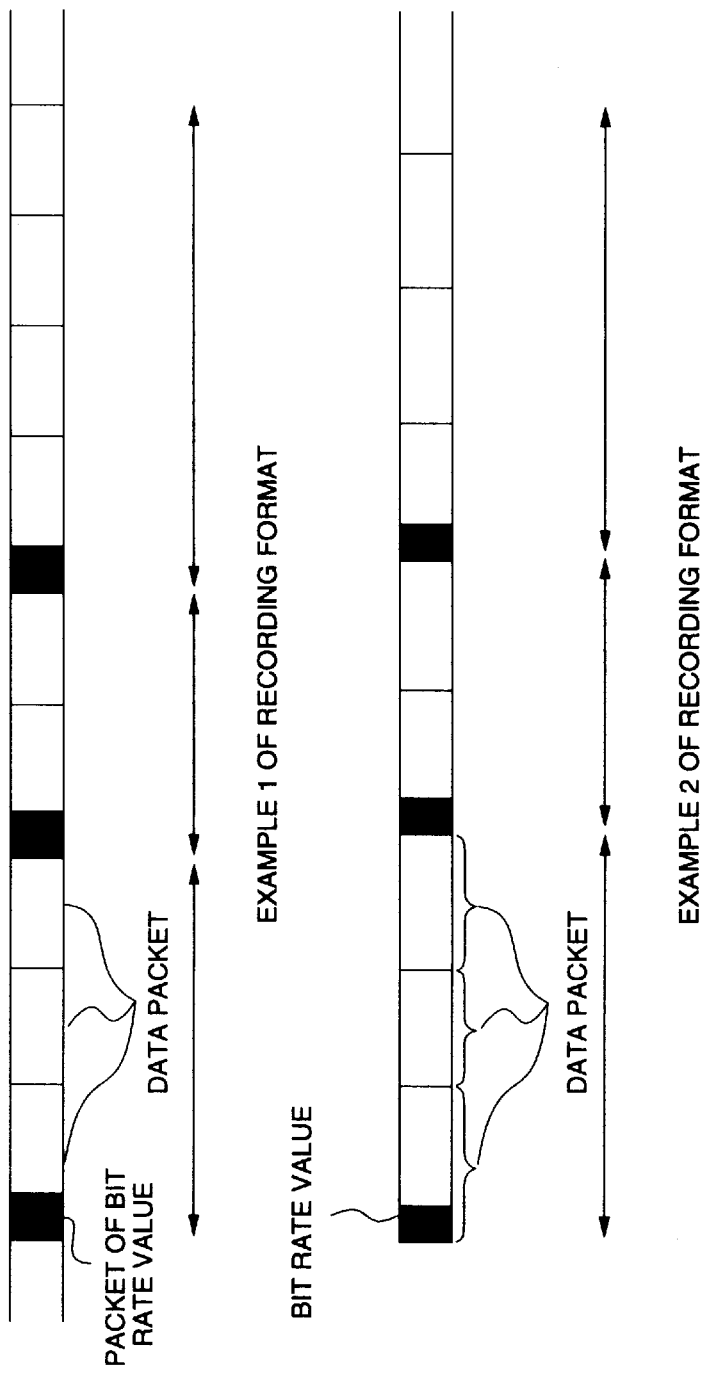
FIG. 13A shows a recording format of a recording medium 101 and FIG. 13B shows another recording format of the recording medium 101.

FIG. 13A shows a recording format when bit rate data are set as a packet which is different from a data packet (packeted in a format different from that of the data packet) and output from the packet outputting circuit 192, and FIG. 13B shows a recording format when bit rate data (bit rate value) are output from the packet outputting circuit 192 while contained in the data packet. In this case, the data can be recorded highly efficiently.

FIG. 14 shows the construction of an embodiment of the encode data transmission device for transmitting through the network 3 the data which are recorded on the recording medium 201 as described above.

Under the control of the interval calculating and setting circuit 205, a read-out control circuit 202 reads out the data from a recording medium 201 and supplies the data to a buffer 203. The buffer 203 comprises an FIFO (First in First Out) memory, and temporarily stores data from the read-out control circuit 202. A bit rate value detector 204 successively reads out data stored in the buffer 203 to detect the bit rate data in the read-out data. Further, the bit rate value detector 204 outputs the detected bit rate data to the interval calculating and setting circuit 205, and also outputs to the interval calculating and setting circuit 205 those data which are left through the above bit rate data detecting operation, that is, the data packet. Like the interval calculating and setting circuit 193 shown in FIG. 11, the interval calculating and setting circuit 205 calculates the interval for the data packet transmission (packet interval) on the basis of the bit rate data from the bit rate value detector 204, and outputs the interval to a transmitter 206 together with the bit rate data (bit rate value packet) and the data packet. The transmitter 206 transmits the bit rate data from the interval calculating and setting circuit 205, and then transmits the data packet at the interval which is calculated in the interval calculating and setting circuit 205.

In the encode data transmission device thus constructed, when an operation unit (not shown) is manipulated, the readout control circuit 202 receives a data read-out demand to read out data from the recording medium 201, and supplies the read-out data to the buffer 203 to store the data in the buffer 203. When the data are stored in the buffer 203, the bit rate value detector 204 successively reads out the data to detect the bit rate data (bit rate value packet) from the data, and outputs the bit rate data to the interval calculating and setting circuit 205 together with the residual data packet.

In the interval calculating and setting circuit 205, the output of the bit rate value detector 204 is directly supplied to the transmitter 206, and further the interval for the transmission of the data packet (packet interval) is calculated on the basis of the bit rate data and then output to the read-out control circuit 202 and the transmitter 206.

The read-out operation of the data from the recording medium 201 is controlled on the basis of the interval of the packet which is supplied from the interval calculating and setting circuit 205. That is, when the packet interval is long, the data transmission needs a long time, so that the read-out rate of the data from the recording medium 201 is reduced. On the other hand, when the data transmission needs little time, the read-out rate of the data from the recording medium 201 is increased.

In the transmitter 206, the bit rate data is first transmitted, and then the data packet is transmitted at the interval which is calculated by the interval calculating and setting circuit 205.

Accordingly, the data are output from the encode data transmission device like the case where the data are output from the packet outputting circuit 192, and thus the variation of the packet arrival interval and the delay fluctuation on the network can be absorbed by the adjustment circuit 131 shown in FIG. 7 as described above.

While specific embodiments of the invention have been shown and disclosed, it is to be understood that numerous changes and modifications may be made by those skilled in the art without departing from the scope and intent of the invention.

What is claimed is:

1. A data decoding apparatus, comprising:
   means for receiving a plurality of data packets to be decoded;
   a buffer for temporarily storing said data packets, wherein said packets stored in said buffer are read out of said buffer according to an output control means that operates at an output rate;
   a counter for maintaining a count of the number of packets stored in said buffer;
   means for sampling said counter at a given time to determine a current count at that time;
   means for comparing said current count to a predetermined desired count;
   means for increasing said output rate when said current count is greater than said desired count, and for decreasing said output rate when said current count is less than said desired count; and
   a packet decoder for decoding said packets as they are output from said buffer.

2. The apparatus as set forth in claim 1, further comprising:
   means for extracting time information from one or more of said data packets; and
   means for generating a system clock signal from said extracted time information, wherein said system clock signal is used to process said received data.

3. The apparatus as set forth in claim 1, wherein said counter is incremented when one of said packets is stored in said buffer and decremented when one of said packets is read out of said buffer.

4. The apparatus as set forth in claim 1, wherein said means for sampling is operable to sample said counter at a predetermined sampling rate.

5. The apparatus as set forth in claim 1, wherein said means for sampling samples said counter in response to a sampling signal, and wherein said means for sampling further comprises:
   a sampling means counter for counting cycles of an oscillator;
   means for comparing the count value of said sampling means counter to a predetermined sampling reference count value; and
   means for generating said sampling signal when said count value of said sampling means counter and said predetermined sampling reference count value are equal.

6. The apparatus as set forth in claim 1, wherein said means for increasing/decreasing said output rate increases/decreases said output rate in predetermined fixed increments.

7. The apparatus as set forth in claim 1, wherein said output control means comprises:
   an output counter for counting cycles of an oscillator;
   means for comparing the count value of said output counter to a predetermined output reference count value; and
   means for outputting a packet from said buffer and resetting said output counter when said count value of said output counter and said predetermined output reference count value are equal.

8. The apparatus as set forth in claim 7, wherein said means for increasing/decreasing said output rate decrements said predetermined output reference count value when said output rate is to be increased, and increments said predetermined output reference count value when said output rate is to be decreased.

9. The apparatus according to claim 1, further comprising:
   interval detection means for detecting interval data indicative of a period of time between reception of any two of said packets; and
   delay time control means for delaying the reading of packets from said buffer in accordance with said interval data.

10. A data decoding method, comprising the steps of:
    receiving a plurality of data packets to be decoded;
    storing said data packets in a buffer temporarily, wherein said packets stored in said buffer are read out of said buffer according to an output control means that operates at an output rate;
    maintaining a count of the number of packets stored in said buffer;
    sampling said count at a given time to determine a current count at that time;
    comparing said current count to a predetermined desired count;
    increasing said output rate when said current count is greater than said desired count, and decreasing said output rate when said current count is less than said desired count; and
    decoding said packets as they are output from said buffer.

11. The method as set forth in claim 10, further comprising the steps of:
    extracting time information from one or more of said data packets; and generating a system clock signal from said extracted time information, wherein said system clock signal is used to process said received data.

12. The method as set forth in claim 10, wherein said step of maintaining a count comprises the steps of incrementing said count when one of said packets is stored in said buffer and decrementing said count when one of said packets is read out of said buffer.

13. The method as set forth in claim 10, wherein said step of sampling is performed at a predetermined sampling rate.

14. The method as set forth in claim 10, wherein said step of sampling is performed in response to a sampling signal, and wherein said step of sampling comprises the steps of:

counting cycles of an oscillator to generate a sampling count value;

comparing said sampling count value to a predetermined sampling reference count value; and generating said sampling signal when said sampling count value and said predetermined sampling reference count value are equal.

15. The method as set forth in claim 10, wherein said step of increasing/decreasing said output rate comprises the step of increasing/decreasing said output rate in predetermined fixed increments.

16. The method as set forth in claim 10, wherein said output control means performs the following steps:

counting cycles of an oscillator to generate an output count value;

comparing said output count value to a predetermined output reference count value; and outputting a packet from said buffer and resetting said output count value when said output count value and said predetermined output reference count value are equal.

17. The method as set forth in claim 16, wherein said step of increasing/decreasing said output rate comprises the steps of:

decrementing said predetermined output reference count value when said output rate is to be increased; and incrementing said predetermined output reference count value when said output rate is to be decreased.

18. The method according to claim 10, further comprising the steps of:

detecting interval data in said received data, said interval data being indicative of a period of time between reception of any two of said packets; and delaying the reading of packets from said buffer in accordance with said interval data.

19. A data encoding apparatus, comprising:

means for partitioning data to be encoded into a plurality of data packets;

means for partitioning said data packets into one or more groups of packets;

means for generating an interval indicator for each group of packets, said interval indicator indicating the interval of time between transmission of any two of said packets and thereby being indicative of the rate at which the packets within said group are transmitted; and means for transmitting said groups of packets such that for each group said data packets and said indicator are associated with each other.

20. The apparatus according to claim 19, wherein for each group said interval indicator is transmitted in an interval indicator packet that is associated with said group.

21. The apparatus according to claim 19, wherein for each group said interval indicator is included within one of said data packets making up said group such that the packet including said interval indicator also includes encoded data.

22. A data encoding method, comprising the steps of:

partitioning data to be encoded into a plurality of data packets;

partitioning said data packets into one or more groups of packets;

generating an interval indicator for each group of packets, said interval indicator indicating the interval of time between transmission of any two of said packets and thereby being indicative of the rate at which the packets within said group are transmitted; and transmitting said groups of packets such that for each group said data packets and said indicator are associated with each other.

23. The method according to claim 22, wherein for each group said interval indicator is transmitted in an interval indicator packet that is associated with said group.

24. The method according to claim 22, wherein for each group said interval indicator is included within one of said data packets making up said group such that the packet including said interval indicator also includes encoded data.

25. A recording medium having data in the form of data packets recorded thereon, wherein said data packets are partitioned into groups, each group including an interval indicator indicating the interval of time between transmission of any two of said packets and thereby being indicative of the rate at which the packets within said group were recorded on said recording medium and/or the rate at which the packets within said group are to be reproduced from said recording medium.

* * * * *